US011283561B2

(12) United States Patent
Namboodiri

(10) Patent No.: US 11,283,561 B2
(45) Date of Patent: Mar. 22, 2022

(54) WIRELESS LOCAL AREA NETWORKS USING ORTHOGONAL TIME FREQUENCY SPACE MODULATION

(71) Applicant: Cohere Technologies, Inc., Santa Clara, CA (US)

(72) Inventor: Devan Namboodiri, Santa Clara, CA (US)

(73) Assignee: Cohere Technologies, Inc., Santa Clara, CA (US)

(*) Notice: Subject to any disclaimer, the term of this patent is extended or adjusted under 35 U.S.C. 154(b) by 15 days.

(21) Appl. No.: 16/643,813

(22) PCT Filed: Sep. 10, 2018

(86) PCT No.: PCT/US2018/050298
§ 371 (c)(1),
(2) Date: Mar. 2, 2020

(87) PCT Pub. No.: WO2019/051427
PCT Pub. Date: Mar. 14, 2019

(65) Prior Publication Data
US 2020/0204309 A1  Jun. 25, 2020

Related U.S. Application Data

(60) Provisional application No. 62/557,116, filed on Sep. 11, 2017.

(51) Int. Cl.
*H04L 5/00* (2006.01)
*H04L 27/26* (2006.01)
*H04W 84/12* (2009.01)

(52) U.S. Cl.
CPC ........ *H04L 5/0023* (2013.01); *H04L 27/2608* (2013.01); *H04W 84/12* (2013.01)

(58) Field of Classification Search
CPC .............. H04L 5/0023; H04L 27/2697; H04L 27/2639; H04L 23/02; H04L 5/0016;
(Continued)

(56) References Cited

U.S. PATENT DOCUMENTS 4,754,493 A   6/1988  Coates
5,083,135 A   1/1992  Nagy et al.
(Continued)

FOREIGN PATENT DOCUMENTS

CN   1235720 A    11/1999
CN   101682316 A   3/2010
(Continued)

OTHER PUBLICATIONS

Anton Monk, Ronny Hadani, Michail Tsatsanis, Shlomo Rakib, OTFS—Orthogonal Time Frequency Space, Cohere Technologies, Aug. 2016 (Year: 2016).*
(Continued)

*Primary Examiner* — Aristocratis Fotakis
(74) *Attorney, Agent, or Firm* — Perkins Coie LLP

(57) ABSTRACT

Techniques for wireless networking that include transmission and reception of signals using orthogonal time frequency space (OTFS) modulation techniques are disclosed. For example, a wireless access point may communicate with a station using OFDM modulated WiFi (OFDM-WiFi) at one time and using OTFS modulated WiFi (OTFS-WiFi) at another time. The OTFS-WiFi may provide improved throughput and coverage over OFDM-WiFi in static and mobile environments.

11 Claims, 30 Drawing Sheets

(58) Field of Classification Search
CPC ....... H04W 84/12; H04W 80/02; H04J 11/00; H04J 2011/0003
See application file for complete search history.

(56) References Cited

U.S. PATENT DOCUMENTS

| | | | |
|---|---|---|---|
| 5,182,642 A | 1/1993 | Gersdorff et al. |
| 5,623,511 A | 4/1997 | Bar-David et al. |
| 5,831,977 A | 11/1998 | Dent |
| 5,872,542 A | 2/1999 | Simons et al. |
| 5,956,624 A | 9/1999 | Hunsinger et al. |
| 6,212,246 B1 | 4/2001 | Hendrickson |
| 6,289,063 B1 | 9/2001 | Duxbury |
| 6,356,555 B1 | 3/2002 | Rakib et al. |
| 6,388,621 B1 | 5/2002 | Lynch |
| 6,426,983 B1 | 7/2002 | Rakib et al. |
| 6,608,864 B1 | 8/2003 | Strait |
| 6,631,168 B2 | 10/2003 | Izumi |
| 6,704,366 B1 | 3/2004 | Combes et al. |
| 6,956,814 B1 | 10/2005 | Campanella |
| 7,010,048 B1 | 3/2006 | Shattil |
| 7,327,812 B2 | 2/2008 | Auer |
| 7,392,018 B1 | 6/2008 | Ebert et al. |
| 7,689,049 B2 | 3/2010 | Monro |
| 7,773,685 B2 | 8/2010 | Tirkkonen et al. |
| 7,864,877 B2 | 1/2011 | Hottinen |
| 8,229,017 B1 | 7/2012 | Lee et al. |
| 8,259,845 B2 | 9/2012 | Dent |
| 8,401,131 B2 | 3/2013 | Fety et al. |
| 8,547,988 B2 | 10/2013 | Hadani et al. |
| 8,619,892 B2 | 12/2013 | Vetter et al. |
| 8,717,210 B2 | 5/2014 | Eldar et al. |
| 8,879,378 B2 | 11/2014 | Rakib et al. |
| 8,892,048 B1 | 11/2014 | Turner |
| 8,976,851 B2 | 3/2015 | Hadani et al. |
| 9,031,141 B2 | 5/2015 | Hadani et al. |
| 9,071,285 B2 | 6/2015 | Hadani et al. |
| 9,071,286 B2 | 6/2015 | Hadani et al. |
| 9,083,483 B1 | 7/2015 | Rakib et al. |
| 9,083,595 B2 | 7/2015 | Rakib et al. |
| 9,130,638 B2 | 9/2015 | Hadani et al. |
| 9,282,528 B2 | 3/2016 | Hashimoto |
| 9,294,315 B2 | 3/2016 | Hadani et al. |
| 9,444,514 B2 | 9/2016 | Hadani et al. |
| 9,548,840 B2 | 1/2017 | Hadani et al. |
| 9,553,984 B2 | 1/2017 | Krause et al. |
| 9,590,779 B2 | 3/2017 | Hadani et al. |
| 9,634,719 B2 | 4/2017 | Rakib et al. |
| 9,660,851 B2 | 5/2017 | Hadani et al. |
| 9,668,148 B2 | 5/2017 | Hadani et al. |
| 9,712,354 B2 | 7/2017 | Hadani et al. |
| 9,729,281 B2 | 8/2017 | Hadani et al. |
| 2001/0031022 A1 | 10/2001 | Petrus et al. |
| 2001/0033614 A1 | 10/2001 | Hudson |
| 2001/0046205 A1 | 11/2001 | Easton et al. |
| 2002/0001308 A1 | 1/2002 | Heuer |
| 2002/0034191 A1 | 3/2002 | Shattil |
| 2002/0181388 A1 | 12/2002 | Jain et al. |
| 2002/0181390 A1 | 12/2002 | Mody et al. |
| 2002/0181607 A1 | 12/2002 | Izumi |
| 2003/0073464 A1 | 4/2003 | Giannakis et al. |
| 2003/0185295 A1 | 10/2003 | Yousef |
| 2003/0235147 A1 | 12/2003 | Walton et al. |
| 2004/0044715 A1 | 3/2004 | Aldroubi et al. |
| 2004/0174812 A1 | 9/2004 | Murakami et al. |
| 2004/0189581 A1 | 9/2004 | Sako et al. |
| 2004/0218523 A1 | 11/2004 | Varshney et al. |
| 2005/0157778 A1 | 7/2005 | Trachewsky et al. |
| 2005/0157820 A1 | 7/2005 | Wongwirawat et al. |
| 2005/0180517 A1 | 8/2005 | Abe |
| 2005/0207334 A1 | 9/2005 | Hadad |
| 2005/0251844 A1 | 11/2005 | Martone et al. |
| 2006/0008021 A1 | 1/2006 | Bonnet |
| 2006/0039270 A1 | 2/2006 | Strohmer et al. |
| 2007/0014272 A1 | 1/2007 | Palanki et al. |
| 2007/0038691 A1 | 2/2007 | Candes et al. |
| 2007/0078661 A1 | 4/2007 | Sriram et al. |
| 2007/0104283 A1 | 5/2007 | Han et al. |
| 2007/0110131 A1 | 5/2007 | Guess et al. |
| 2007/0211952 A1 | 9/2007 | Faber et al. |
| 2007/0237181 A1 | 10/2007 | Cho et al. |
| 2007/0253465 A1 | 11/2007 | Muharemovic et al. |
| 2007/0253504 A1 | 11/2007 | Hasegawa |
| 2008/0043857 A1 | 2/2008 | Dias et al. |
| 2008/0117999 A1 | 5/2008 | Kadous et al. |
| 2008/0186843 A1 | 8/2008 | Ma et al. |
| 2008/0187062 A1 | 8/2008 | Pan et al. |
| 2008/0232504 A1 | 9/2008 | Ma et al. |
| 2008/0310383 A1 | 12/2008 | Kowalski |
| 2009/0080403 A1 | 3/2009 | Hamdi |
| 2009/0092259 A1 | 4/2009 | Jot et al. |
| 2009/0103593 A1 | 4/2009 | Bergamo |
| 2009/0122854 A1 | 5/2009 | Zhu et al. |
| 2009/0161804 A1 | 6/2009 | Chrabieh et al. |
| 2009/0204627 A1 | 8/2009 | Hadani |
| 2009/0222226 A1 | 9/2009 | Baraniuk et al. |
| 2009/0303961 A1 | 12/2009 | Popovic et al. |
| 2010/0001901 A1 | 1/2010 | Baraniuk et al. |
| 2010/0008432 A1 | 1/2010 | Kim et al. |
| 2010/0027608 A1 | 2/2010 | Priotti |
| 2010/0111138 A1 | 5/2010 | Hosur et al. |
| 2010/0142476 A1 | 6/2010 | Jiang et al. |
| 2010/0187914 A1 | 7/2010 | Rada et al. |
| 2010/0238787 A1 | 9/2010 | Guey |
| 2010/0277308 A1 | 11/2010 | Potkonjak |
| 2010/0303136 A1 | 12/2010 | Ashikhmin et al. |
| 2010/0322349 A1 | 12/2010 | Lee et al. |
| 2011/0007789 A1 | 1/2011 | Garmany |
| 2011/0110532 A1 | 5/2011 | Svendsen |
| 2011/0116489 A1 | 5/2011 | Grandhi |
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0216808 A1 | 9/2011 | Tong et al. |
| 2011/0286502 A1 | 11/2011 | Adachi et al. |
| 2011/0287778 A1 | 11/2011 | Levin et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Riu et al. |
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0170684 A1 | 7/2012 | Mm et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0263157 A1* | 10/2012 | Porat ............... H04L 5/0023 370/338 |
| 2012/0269201 A1 | 10/2012 | Atungsiri et al. |
| 2012/0272117 A1 | 10/2012 | Stadelmeier et al. |
| 2012/0320994 A1 | 12/2012 | Loghin et al. |
| 2013/0021977 A1 | 1/2013 | Yang et al. |
| 2013/0058390 A1 | 3/2013 | Haas et al. |
| 2013/0077579 A1 | 3/2013 | Cho et al. |
| 2013/0083661 A1 | 4/2013 | Gupta et al. |
| 2013/0121497 A1 | 5/2013 | Smaragdis et al. |
| 2013/0230010 A1 | 9/2013 | Kim et al. |
| 2013/0260787 A1 | 10/2013 | Hashimoto |
| 2013/0279627 A1 | 10/2013 | Wu et al. |
| 2013/0315133 A1 | 11/2013 | Wang et al. |
| 2014/0143639 A1 | 5/2014 | Loghin et al. |
| 2014/0161154 A1 | 6/2014 | Hadani et al. |
| 2014/0169385 A1 | 6/2014 | Hadani et al. |
| 2014/0169406 A1 | 6/2014 | Hadani et al. |
| 2014/0169433 A1 | 6/2014 | Hadani et al. |
| 2014/0169436 A1 | 6/2014 | Hadani et al. |
| 2014/0169437 A1 | 6/2014 | Hadani et al. |
| 2014/0169441 A1 | 6/2014 | Hadani et al. |
| 2014/0247803 A1 | 9/2014 | Arambepola et al. |
| 2014/0348252 A1 | 11/2014 | Siohan et al. |
| 2014/0364128 A1 | 12/2014 | Lee et al. |
| 2015/0117395 A1 | 4/2015 | Hadani et al. |
| 2015/0326273 A1 | 11/2015 | Rakib et al. |

(56) References Cited

U.S. PATENT DOCUMENTS

| | | | |
|---|---|---|---|
| 2015/0327085 A1 | 11/2015 | Hadani et al. | |
| 2015/0382231 A1 | 12/2015 | Jabbar et al. | |
| 2016/0043835 A1 | 2/2016 | Hadani et al. | |
| 2016/0128072 A1* | 5/2016 | Rajagopal | H04L 27/2602 |
| | | | 370/329 |
| 2016/0135132 A1 | 5/2016 | Donepudi et al. | |
| 2016/0182269 A1 | 6/2016 | Hadani et al. | |
| 2016/0191217 A1 | 6/2016 | Hadani et al. | |
| 2016/0191280 A1 | 6/2016 | Hadani et al. | |
| 2016/0254889 A1 | 9/2016 | Shattil | |
| 2016/0277225 A1 | 9/2016 | Frenne et al. | |
| 2016/0309345 A1 | 10/2016 | Tehran et al. | |
| 2016/0323058 A1* | 11/2016 | Cordeiro | H04L 1/0003 |
| 2016/0380743 A1 | 12/2016 | Rakib | |
| 2016/0381576 A1 | 12/2016 | Hadani et al. | |
| 2017/0012749 A1 | 1/2017 | Rakib et al. | |
| 2017/0012810 A1 | 1/2017 | Rakib et al. | |
| 2017/0019297 A1 | 1/2017 | Rakib | |
| 2017/0033899 A1 | 2/2017 | Rakib et al. | |
| 2017/0040711 A1 | 2/2017 | Rakib et al. | |
| 2017/0078054 A1 | 3/2017 | Hadani et al. | |
| 2017/0099122 A1 | 4/2017 | Hadani et al. | |
| 2017/0099607 A1* | 4/2017 | Hadani | H04L 5/0016 |
| 2017/0149594 A1 | 5/2017 | Rakib et al. | |
| 2017/0149595 A1 | 5/2017 | Rakib et al. | |
| 2017/0201354 A1 | 7/2017 | Hadani et al. | |
| 2017/0207817 A1 | 7/2017 | Hadani et al. | |
| 2017/0222700 A1 | 8/2017 | Hadani et al. | |
| 2017/0230215 A1 | 8/2017 | Rakib et al. | |
| 2017/0244524 A1 | 8/2017 | Hadani et al. | |
| 2019/0268113 A1* | 8/2019 | Lee | H04L 5/0092 |

FOREIGN PATENT DOCUMENTS

| | | | | |
|---|---|---|---|---|
| CN | 101939935 A | 1/2011 | | |
| EP | 1432168 A1 | 6/2004 | | |
| JP | 2011127910 A | 6/2011 | | |
| WO | 2007004297 | 1/2007 | | |
| WO | 2011137699 A1 | 11/2011 | | |
| WO | 2011150315 | 12/2011 | | |
| WO | 2013148546 | 10/2013 | | |
| WO | 2014004585 | 1/2014 | | |
| WO | 2016014596 | 1/2016 | | |
| WO | 2016014598 | 1/2016 | | |
| WO | 2016176642 | 11/2016 | | |
| WO | 2016183230 | 11/2016 | | |
| WO | 2016183240 | 11/2016 | | |
| WO | 2016209848 | 12/2016 | | |
| WO | 2017003952 | 1/2017 | | |
| WO | 2017011478 | 1/2017 | | |
| WO | WO-2017011455 A1 * | 1/2017 | ......... | H04L 27/2697 |
| WO | WO-2017049303 A1 * | 3/2017 | ......... | H04L 27/2697 |

OTHER PUBLICATIONS

Office Action for U.S. Appl. No. 13/117,119, dated Aug. 5, 2013, 5 pages.
Notice of Allowance for U.S. Appl. No. 13/117,119, dated Feb. 28, 2014, 13 pages.
Banelli, P. et al., "Modulation Formats and Waveforms for 5G Networks: Who Will Be the Heir of OFDM?," IEEE Signal Processing Magazine, vol. 81, pp. 80-93, Nov. 2014.
El Hattachi, R. et al., "NGMN 5G Initiative White Paper," NGMN Alliance, Feb. 17, 2015. [Online]. Available: https://www.ngmn.org/uploads/media/NGMN_5G_White_Paper_V1_0.pdf, 125 pages.
Rusek, F. et al., "Scaling Up MIMO, Opportunities and Challenges with Very Large Arrays," IEEE Signal Processing Magazine, pp. 40-60 (2013).
Vodafone, "Cellular Internet of Things: Architectural Aspects," RP-150869, 3GPP RAN#68, Malmo, Sweden (Jun. 9, 2015), 19 pages.
Supplementary European Search Report for European Application No. 11787483.4, dated Sep. 9, 2014, 6 pages.
International Search Report and Written Opinion for International Application No. PCT/US2011/038302, dated Nov. 15, 2011, 8 pages.
International Preliminary Report on Patentability for International Application No. PCT/US2011/038302, dated Dec. 4, 2012, 7 pages.
Office Action for U.S. Appl. No. 13/117,124, dated Feb. 22, 2013, 7 pages.
Notice of Allowance for U.S. Appl. No. 13/117,124, dated Aug. 8, 2013, 10 pages.
Office Action for U.S. Appl. No. 14/605,957, dated Jun. 22, 2017, 6 pages.
Supplementary European Search Report for European Application No. 13809004.8, dated Apr. 14, 2016, 8 pages.
Communication Pursuant to Article 94(3) EPC for European Application No. 13809004.8, dated Feb. 17, 2017, 5 pages.
Notice of Allowance for U.S. Appl. No. 13/927,087, dated Feb. 25, 2015, 9 pages.
Office Action for U.S. Appl. No. 13/927,087, dated Nov. 12, 2014, 14 pages.
Gurevich, S. et al. "Group Representation Design of Digital Signals and Sequences," S.W. Golomb et al. (eds.), SETA 2008, LNCS 5203, pp. 153-166, Springer-Verlag Berlin Heidelberg (2008).
International Search Report and Written Opinion for International Application No. PCT/US2013/047723, dated Oct. 29, 2013, 17 pages.
International Preliminary Report on Patentability for International Application No. PCT/US2013/047723, dated Dec. 31, 2014, 15 pages.
Notice of Allowance for U.S. Appl. No. 13/927,088, dated Feb. 18, 2015, 7 pages.
Office Action for U.S. Appl. No. 13/927,088, dated Nov. 28, 2014, 13 pages.
Notice of Allowance for U.S. Appl. No. 13/927,086, dated Dec. 26, 2014, 8 pages.
Supplemental Notice of Allowability for U.S. Appl. No. 13/927,086, dated Mar. 19, 2015, 4 pages.
Office Action for U.S. Appl. No. 13/927,086, dated Oct. 14, 2014, 10 pages.
Office Action for U.S. Appl. No. 13/927,089, dated Dec. 24, 2014, 13 pages.
Office Action for U.S. Appl. No. 13/927,089, dated Aug. 14, 2015, 7 pages.
Supplemental Notice of Allowability for U.S. Appl. No. 13/927,091, dated Jun. 11, 2015, 4 pages.
Notice of Allowance for U.S. Appl. No. 13/927,091, dated Apr. 24, 2015, 8 pages.
Office Action for U.S. Appl. No. 13/927,091, dated Jan. 27, 2015, 15 pages.
Office Action for U.S. Appl. No. 13/927,092, dated Oct. 8, 2014, 5 pages.
Notice of Allowance for U.S. Appl. No. 13/927,092, dated Oct. 24, 2014, 7 pages.
Office Action for U.S. Appl. No. 13/927,095, dated Apr. 30, 2015, 11 pages.
Office Action for U.S. Appl. No. 13/927,095, dated Nov. 4, 2015, 9 pages.
Office Action for U.S. Appl. No. 13/927,095, dated Jun. 1, 2016, 10 pages.
Office Action for U.S. Appl. No. 14/717,886, dated Apr. 19, 2016, 10 pages.
Office Action for U.S. Appl. No. 14/709,377, dated Dec. 11, 2015, 12 pages.
Office Action for U.S. Appl. No. 14/709,377, dated Jul. 13, 2016, 17 pages.
Examination Report No. 1 for Australian Application No. 2013239970, dated Dec. 8, 2015, 3 pages.
"AT&T Annual Report 2014," Opening Our Network [Online]. Retrieved from the Internet: Sep. 22, 2016. <URL: http://www.att.com/Investor/ATT_Annual/2014/att_introduces_new_concepts_for_telecom_network.html>, 5 pages.
Catt, "UL ACK/NACK transmission methods for LTE-A," 3GPP TSG RAN WG1 Meeting #60bis, R1-102453, Beijing, China, Apr. 12-16, 2010, 8 pages.

(56) References Cited

OTHER PUBLICATIONS

Toskala, A. et al., "Physical Layer," Chapter 5 In: "LTE for UMTS: OFDMA and SC-FDMA Based Radio Access," Holma, H. et al. (eds.), John Wiley & Sons, Ltd., United Kingdom, 2009, pp. 83-135.
Mecklenbrauker, W., "A Tutorial on Non-Parametric Bilinear Time-Frequency Signal Representations," In: Time and Frequency Representation of Signals and Systems, Longo, G. et al. (eds.), Springer-Verlag Wien, vol. 309, pp. 11-68 (1989).
Nehorai, A. et al., "MURI: Adaptive waveform design for full spectral dominance (2005-2010)," AFOSR FA9550-05-1-0443, Final Report, [online], Mar. 11, 2011 Retrieved on May 11, 2013, Retrieved from the Internet <URL: http://oai.dtic.mil/oai/oai?verb=getRecord&metadataPrefix=html&identifier=ADA565420>, 103 pages.
Office Action for Japanese Application No. 2015-518647, dated Jul. 7, 2015, 10 pages.
Office Action for U.S. Appl. No. 14/754,596, dated Apr. 19, 2016, 18 pages.
Office Action for U.S. Appl. No. 14/809,129, dated Jul. 19, 2016, 5 pages.
Office Action for U.S. Appl. No. 15/617,962, dated Sep. 6, 2017, 10 pages.
International Search Report and Written Opinion for International Application No. PCT/US2016/050825, dated Feb. 8, 2017, 12 pages.
International Search Report and Written Opinion for International Application No. PCT/US2016/052524, dated Dec. 20, 2016, 8 pages.
Office Action for U.S. Appl. No. 15/374,995, dated Aug. 7, 2017, 6 pages.
International Search Report and Written Opinion for International Application No. PCT/US2017/025797, dated Jun. 21, 2017, 6 pages.
International Search Report and Written Opinion for International Application No. PCT/US2016/030259, dated Aug. 4, 2016, 13 pages.
Office Action for U.S. Appl. No. 15/152,464, dated Apr. 6, 2017, 10 pages.
Examination Report No. 1 for Australian Application No. 2013280487, dated May 2, 2016, 3 pages.
International Search Report and Written Opinion for International Application No. PCT/US2016/031928, dated Oct. 7, 2016, 10 pages.
Office Action for U.S. Appl. No. 15/188,946, dated May 8, 2017, 14 pages.
International Search Report and Written Opinion for International Application No. PCT/US2016/038584, dated Sep. 26, 2016, 8 pages.
Office Action for U.S. Appl. No. 15/187,668, dated Feb. 16, 2017, 6 pages.
International Search Report and Written Opinion for International Application No. PCT/US2016/031909, dated Aug. 11, 2016, 13 pages.
Office Action for U.S. Appl. No. 15/194,494, dated May 5, 2017, 16 pages.
International Search Report and Written Opinion for International Application No. PCT/US2016/039662, dated Nov. 29, 2016, 14 pages.
Office Action for U.S. Appl. No. 15/436,653, dated Jun. 2, 2017, 10 pages.
Office Action for U.S. Appl. No. 15/208,545, dated Aug. 21, 2017, 15 pages.
International Search Report and Written Opinion for International Application No. PCT/US2016/041940, dated Oct. 20, 2016, 8 pages.
Supplementary European Search Report for European Application No. 13768150.8, dated Oct. 30, 2015, 7 pages.
International Search Report and Written Opinion for International Application No. PCT/US2013/033652, dated Jun. 12, 2013, 8 pages.
International Search Report and Written Opinion for International Application No. PCT/US2015/041417, dated Oct. 1, 2015, 7 pages.
Office Action for U.S. Appl. No. 14/805,407, dated Dec. 14, 2016, 7 pages.
International Search Report and Written Opinion for International Application No. PCT/US2015/041420, dated Oct. 1, 2015, 6 pages.

\* cited by examiner

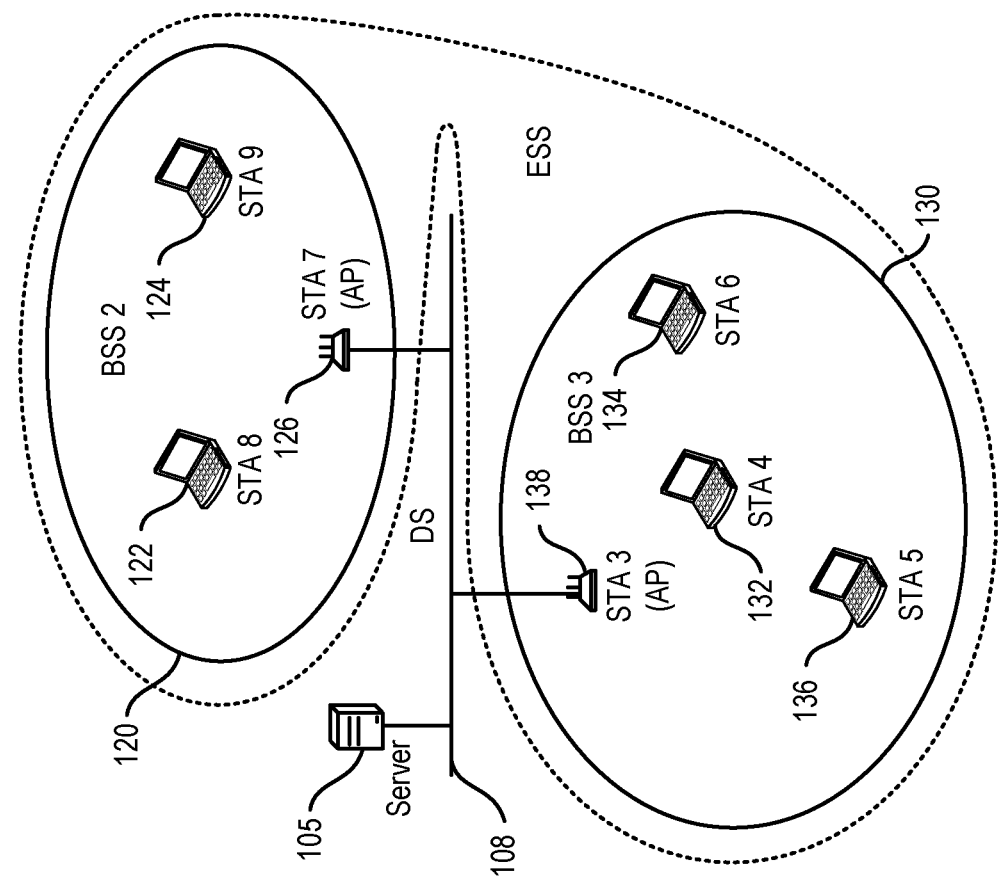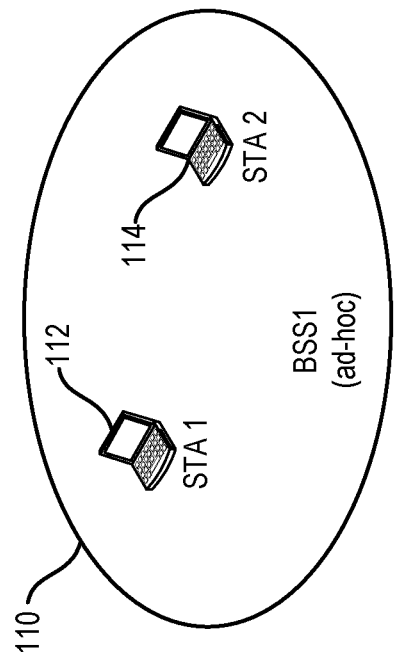
FIG. 1

| Rate bit field | Data rate (Mbps) | Modulation | Code rate |
| --- | --- | --- | --- |
| 1101 | 6 | BPSK | 1/2 |
| 1111 | 9 | BPSK | 3/4 |
| 0101 | 12 | QPSK | 1/2 |
| 0111 | 18 | QPSK | 3/4 |
| 1001 | 24 | 16-QAM | 1/2 |
| 1011 | 36 | 16-QAM | 3/4 |
| 0001 | 48 | 64-QAM | 2/3 |
| 0011 | 54 | 64-QAM | 3/4 |

| Rate 4 bits | Reserved 1 bit | Length 12 bits | Parity 1 bit | Tail 6 bits |
| --- | --- | --- | --- | --- |

FIG. 11

| MCS index | Modulation | R | $N_{BPSCS}$ | $N_{CBPSS}$ | $N_{DBPS}$ | Data rate (Mbps) |
|---|---|---|---|---|---|---|
| 8 | BPSK | 1/2 | 1 | 104 | 52 | 13.0 |
| 9 | QPSK | 1/2 | 2 | 208 | 104 | 26.0 |
| 10 | QPSK | 3/4 | 2 | 208 | 156 | 39.0 |
| 11 | 16-QAM | 1/2 | 4 | 416 | 208 | 52.0 |
| 12 | 16-QAM | 3/4 | 4 | 416 | 312 | 78.0 |
| 13 | 64-QAM | 2/3 | 6 | 624 | 416 | 104.0 |
| 14 | 64-QAM | 3/4 | 6 | 624 | 468 | 117.0 |
| 15 | 64-QAM | 5/6 | 6 | 624 | 520 | 130.0 |

| MCS index | Modulation | R | $N_{BPSCS}$ | $N_{CBPSS}$ | $N_{DBPS}$ | Data rate (Mbps) |
|---|---|---|---|---|---|---|
| 16 | BPSK | 1/2 | 1 | 156 | 78 | 19.5 |
| 17 | QPSK | 1/2 | 2 | 312 | 156 | 39.0 |
| 18 | QPSK | 3/4 | 2 | 312 | 234 | 58.5 |
| 19 | 16-QAM | 1/2 | 4 | 624 | 312 | 78.0 |
| 20 | 16-QAM | 3/4 | 4 | 624 | 468 | 117.0 |
| 21 | 64-QAM | 2/3 | 6 | 936 | 624 | 156.0 |
| 22 | 64-QAM | 3/4 | 6 | 936 | 702 | 175.5 |
| 23 | 64-QAM | 5/6 | 6 | 936 | 780 | 195.0 |

FIG. 18

| MCS index | Modulation | R | N_BPSCS | N_CBPSS | N_DBPS | Data rate (Mbps) |
|---|---|---|---|---|---|---|
| 16 | BPSK | 1/2 | 1 | 156 | 78 | 19.5 |
| 17 | QPSK | 1/2 | 2 | 312 | 156 | 39.0 |
| 18 | QPSK | 3/4 | 2 | 312 | 234 | 58.0 |
| 19 | 16-QAM | 1/2 | 4 | 624 | 312 | 78.0 |
| 20 | 16-QAM | 3/4 | 4 | 624 | 468 | 117.0 |
| 21 | 64-QAM | 2/3 | 6 | 936 | 624 | 156.0 |
| 22 | 64-QAM | 3/4 | 6 | 936 | 702 | 175.5 |
| 23 | 64-QAM | 5/6 | 6 | 936 | 780 | 195.0 |

| MCS index | Modulation | R | N_BPSCS | N_CBPSS | N_DBPS | Data rate (Mbps) |
|---|---|---|---|---|---|---|
| 24 | BPSK | 1/2 | 1 | 208 | 104 | 26.0 |
| 25 | QPSK | 1/2 | 2 | 416 | 208 | 52.0 |
| 26 | QPSK | 3/4 | 2 | 416 | 312 | 78.0 |
| 27 | 16-QAM | 1/2 | 4 | 832 | 416 | 104.0 |
| 28 | 16-QAM | 3/4 | 4 | 832 | 624 | 156.0 |
| 29 | 64-QAM | 2/3 | 6 | 1248 | 832 | 208.0 |
| 30 | 64-QAM | 3/4 | 6 | 1248 | 936 | 234.0 |
| 31 | 64-QAM | 5/6 | 6 | 1248 | 1040 | 260.0 |

FIG. 19

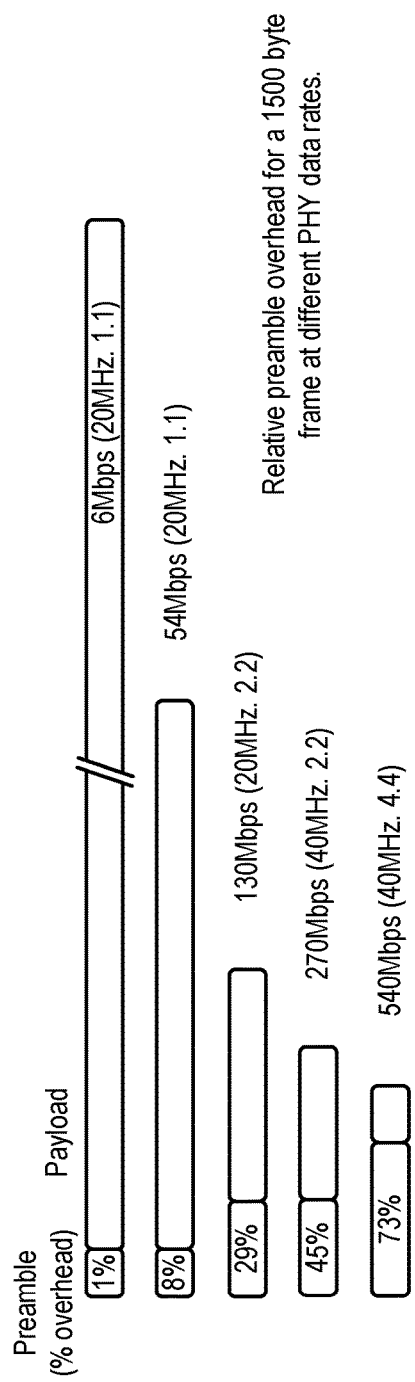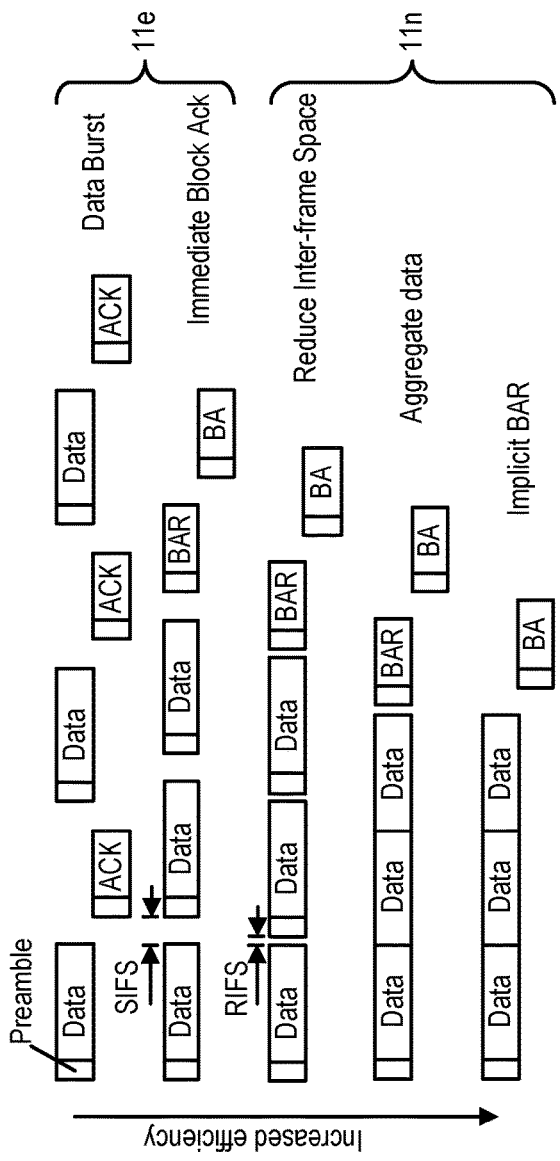
FIG. 26

```
┌─────────────────────────┐   ┌─────────────────────────┐   ┌─────────────────────────┐
│         2710            │   │         2720            │   │         2730            │
│ Transmitting, by the    │   │ Determining, by the     │   │ Transmitting, to the    │
│ first wireless device,  │   │ first wireless device   │   │ second wireless device  │
│ data for reception by   │   │ a capability of the     │   │ data in accordance with │
│ the second wireless     │   │ second wireless device, │   │ the OTFS modulation     │
│ device in accordance    │   │ to communicate in       │   │ scheme, a preamble and  │
│ with a conventional     │   │ accordance with an      │   │ one or more OTFS        │
│ standard                │   │ orthogonal time         │   │ symbols, wherein one or │
│                         │   │ frequency space (OTFS)  │   │ more bits in the        │
│                         │   │ modulation scheme       │   │ preamble indicate to    │
│                         │   │                         │   │ the second wireless     │
│                         │   │                         │   │ device that the one or  │
│                         │   │                         │   │ more OTFS symbols have  │
│                         │   │                         │   │ been sent in accordance │
│                         │   │                         │   │ with the OTFS           │
│                         │   │                         │   │ modulation scheme.      │
└─────────────────────────┘   └─────────────────────────┘   └─────────────────────────┘
```

WIRELESS LOCAL AREA NETWORKS USING ORTHOGONAL TIME FREQUENCY SPACE MODULATION

CROSS REFERENCE TO RELATED APPLICATIONS

This patent document is a 371 National Phase Application of PCT Application No. PCT/US2018/050298 entitled "WIRELESS LOCAL AREA NETWORKS USING ORTHOGONAL TIME FREQUENCY SPACE MODULATION" filed on Sep. 10, 2018 which claims the benefit of priority U.S. Provisional Patent Application No. 62/557,116, filed on Sep. 11, 2017. The entire content of the beforementioned patent application is incorporated by reference as part of the disclosure of this document.

TECHNICAL FIELD

This document relates to the field of telecommunications, in particular, data channels using orthogonal time frequency space (OTFS) modulation for wireless networking.

BACKGROUND

Due to an explosive growth in the number of wireless user devices and the amount of wireless data that these devices can generate or consume, current wireless networks are fast running out of bandwidth to accommodate the growth in data traffic while providing a high quality of service to users. Wireless network protocols and standards are needed that support higher data throughput.

SUMMARY

Techniques are disclosed for wireless networking that include transmission and reception of signals using orthogonal time frequency space (OTFS) modulation. For example, a WiFi wireless access point may communicate with a station using OFDM WiFi at one time and using an OTFS WiFi at another time. As used herein, OFDM WiFi is used to refer to WiFi with a physical layer (PHY) that uses an orthogonal frequency division multiplexing (OFDM) and OTFS WiFi is used to refer to WiFi with a PHY that uses an OTFS modulation. WiFi may be used to refer to both OTFS WiFi and OFDM WiFi. The OTFS modulation scheme may provide improved mobility performance and throughput as well as other advantages over OFDM WiFi.

Methods, systems, apparatuses, and code included in non-transitory computer readable media are disclosed. In one aspect, a method of digital communication between a first wireless device and a second wireless device is disclosed. The method may be implemented at the first wireless device and may include transmitting, by the first wireless device, data for reception by the second wireless device. The transmitting and the reception may be performed in accordance with a WiFi standard. A capability of the first wireless device and the second wireless device to communicate in accordance with an OTFS modulation scheme may be determined. Data may be transmitted in accordance with the OTFS modulation scheme from the first wireless device to the second wireless device. The data may include a preamble and one or more OTFS symbols, wherein one or more bits in the preamble indicate to the second wireless device that the one or more OTFS symbols have been sent in accordance with the OTFS modulation scheme.

In another aspect, a method of digital communication between a first wireless device and a second wireless device is disclosed wherein the method is implemented at the first wireless device. The method may include receiving, by the first wireless device, data transmitted by the second wireless device. The receiving and the transmitted data may be performed in accordance with a WiFi standard. The method may further include determining a capability of the first wireless device and the second wireless device to communicate in accordance with an OTFS modulation scheme. The method may further include receiving, from the second wireless device data in accordance with the OTFS modulation scheme, a preamble and one or more OTFS symbols. One or more bits in the preamble may indicate to the second wireless device that the one or more OTFS symbols have been sent in accordance with the OTFS modulation scheme.

The following features may be included in any combination. The first wireless device may be an access point and the second wireless device may be a station. The first wireless device may be a station and the second wireless device may be an access point. The WiFi standard may use an OFDM scheme. The method may be performed by a wireless communication apparatus comprising a memory and a processor, wherein the memory stores instructions which, when executed by the processor, cause the processor to implement any of the foregoing features.

These, and other aspects are described in the present document.

BRIEF DESCRIPTION OF THE DRAWINGS

FIG. 1 depicts an example of a network, in accordance with some example embodiments.

FIG. 11 depicts physical layer encoding for a data frame.

FIG. 18 depicts examples of IEEE 802.11n modes and data rates.

FIG. 19 depicts examples of IEEE 802.11 modulation schemes and data rates.

FIG. 26 depicts a chart showing reasons for MAC efficiency improvement.

FIG. 27 depicts a process, in accordance with some example embodiments.

Like reference numerals refer to similar features in the Figures.

DETAILED DESCRIPTION

Figure 2:
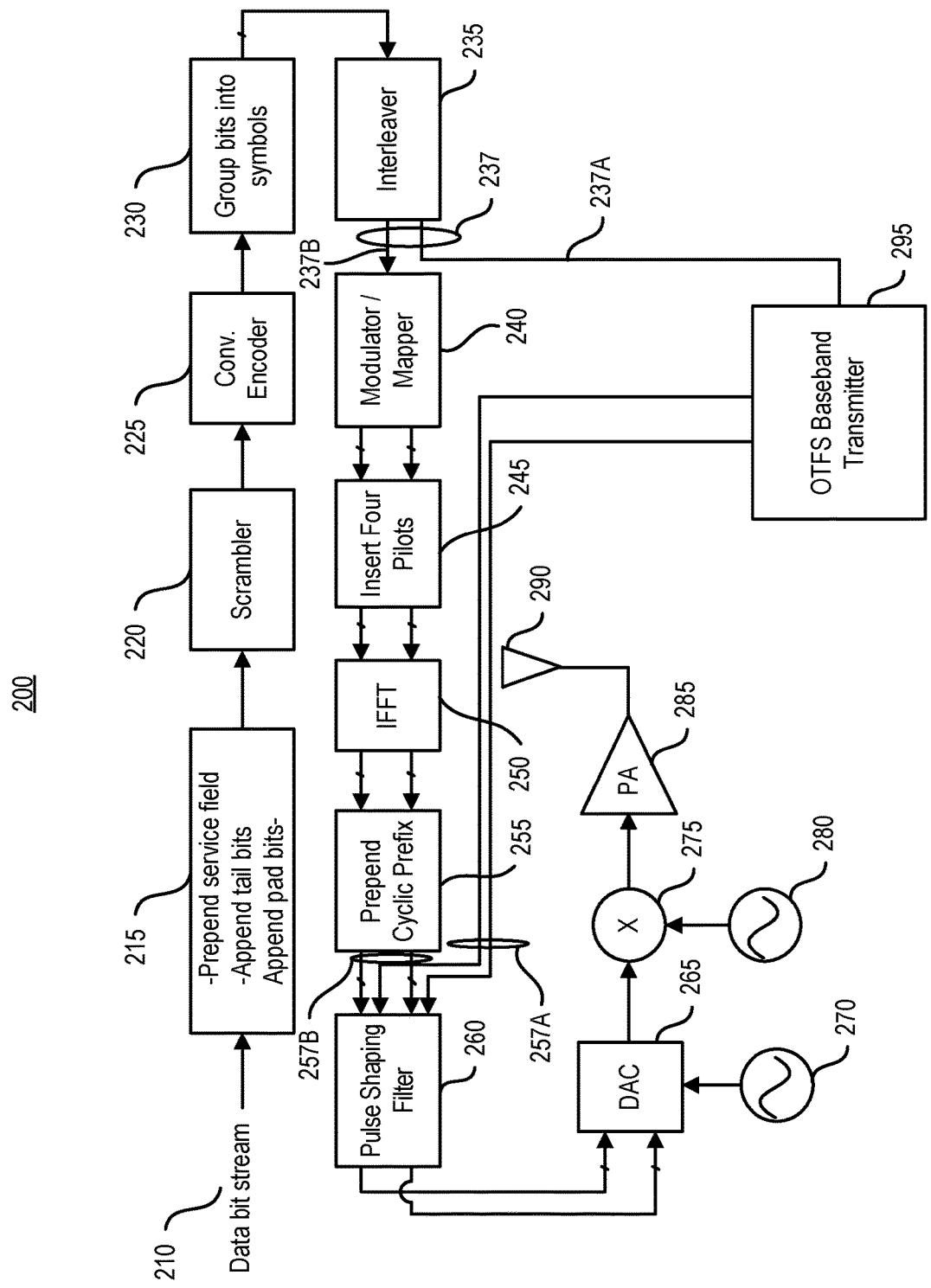
FIG. 2 depicts an example of a transmitter that supports OFDM WiFi and OTFS WiFi, in accordance with some example embodiments.

Wireless Local Area Networking (WLAN which may also be referred to as WiFi networking) and 4G wireless networks have provided the public ubiquitous access to the internet and enabled the explosion of mobile apps and smartphones. This continues the tradition of wireless technologies, where each new generation brings benefits over the previous generation. WiFi has experienced tremendous growth in the last couple of decades. Ever since its inception in 1997, WiFi throughput has been steadily improving. IEEE 802.11b supports 11 megabits per second using a single stream with a bandwidth of 20 MHz. IEEE 802.11ac provides a peak data rate of 7 gigabits per second using eight spectral streams with a bandwidth of 160 MHz. Residential high data rate applications involve content download from video cameras, interactive gaming, watching TV remotely from cable set-top boxes within the home etc. The demand for increased data rates continues to increase. The story is not much different in 4G networks. Current LTE and WiFi networks cannot achieve the cost/performance targets required to support the above objectives, necessitating a new generation of networks involving advanced physical layer (PHY) technologies. There are numerous technical challenges that will have to be overcome in WiFi and 5G networks.

The path to higher spectral efficiency points towards a larger number of antennas in multiple input multiple output (MIMO) systems. However, the benefits of MIMO systems with large numbers of antennas may be hindered by the increased overhead for training, channel estimation and channel tracking for each antenna. A PHY that is robust to channel variations due at least in part to mobile devices will be needed as well as reducing the channel estimation overhead.

Coverage and consistency still plague WiFi in in-home usage scenarios; Robustness (consistency) in WiFi systems, is improved through the increased spectral diversity provided by the use of multiple antennas, Space Time Block Coding (STBC). Channel codes in the form of Low Density Parity Codes (LDPC) add to the robustness. Advanced PHY techniques, to address the coverage, robustness and throughput, in 802.11n such as, Transmit Beamforming (TxBF), STBC and LDPC have been improved in 802.11ac. There are more recent attempts to address the coverage issue by means of WiFi mesh networks in home. However, they usually cannot provide the throughput that a traditional wireless network can.

Some of the foregoing 802.11 standards use CSMA-CA (carrier sense multiple access collision avoidance). Stations using CSMA-CA listen first and once it is determined that no other station is transmitting, a station that has something to transmit may transmit it. At least two types of networks use CSMA-CA including infrastructure networks and ad hoc networks. In infrastructure networks mobile units may communicate through access points. In ad hoc networks, stations communicate peer-to-peer without having a base station giving permission to transmit. CSMA-CA is different from the Ethernet MAC.

Disclosed herein are techniques to improve the throughput, coverage, robustness and mobility capability of OFDM WiFi and other wireless protocols by using an OTFS modulation scheme between OTFS capable access points and stations. Stations may include wireless devices such as portable computers, cellular devices, stationary wireless devices, and the like.

Condition number of a matrix is a measure of its closeness to rank deficiency. MIMO channels can be represented in a matrix form. Condition number of the channel matrix depicts the suitability of the channel for spectral multiplexing and in turn its data carrying capacity. Channel realizations in OFDM modulated systems have condition numbers that vary significantly across sub-carrier bins associated with an OFDM symbol. Channel realizations in OTFS modulated systems have more uniform condition numbers and condition numbers closer to one than OFDM modulated systems. As such, channel realizations in OTFS modulated systems have improved data carrying capability over the channel realizations in OFDM modulated systems. Moreover, the data carrying capability of OTFS systems increases more rapidly than OFDM systems with an increasing number of multiple input multiple output (MIMO) antennas.

By operating using OTFS WiFi, stations experience improved performance such as improved link reliability for mobile devices, improved throughput for mobile and stationary devices, and improved geographical coverage. For example, OFTS WiFi may provide coverage with high link reliability to areas that cannot be served by OFDM WiFi.

FIG. 1 depicts a network 100, in accordance with some example embodiments. Network 100 may include server 105 connected to access points 126 and 138 via wired network interface 108. Network 100 may include stations 112 and 114 wirelessly connected together to form subnetwork 110 with an ad hoc basic service set (BSS) 1. Stations 112 and 114 may be connected via an ad hoc WiFi network standard or any other wireless networking standard. Network 100 may further include stations 132, 134, and 136 wirelessly connected to access point 138 to form subnetwork 130 with BSS 3. Stations 132, 134, and 136 may be connected to access point 138 via WiFi or another wireless standard. Network 100 may further include stations 122 and 124 wirelessly connected to access point 126 to form subnetwork 120 with BSS 2. Stations 122 and 124 may be connected to access point 126 via WiFi or another wireless standard. Access points 126 and 138 may connect to wired network 108 to one another and to server 105. Access points 138 and 126 are shown to connect to three and two stations respectively, but each access point may connect to any other number of stations as well.

In the example of FIG. 1, access point 138 may operate using OFDM WiFi and access point 126 may operate using OFDM WiFi at one time and OTFS WiFi at another time. For example, when station 122 only operates using OFDM WiFi, access point 126 communicates with station 122 using only OFDM WiFi. Continuing the example, when station 124 is capable of operating with OFDM WiFi and OTFS WiFi, access point 126 may operate using OFDM WiFi at some times and OTFS WiFi at other times. OTFS WiFi may provide enhanced performance including higher throughput and/or better link reliability in mobile environments and better coverage, if configured. In this way, an OTFS WiFi capable access point may communicate with OTFS WiFi capable stations to provide better performance than OFDM WiFi.

WiFi is a family of standards developed by the Institute of Electrical and Electronic Engineers (IEEE) and include standards such as IEEE 802.11a, 802.11b, 802.11g, 802.11n, 802.11ac, and others. The disclosed techniques may apply to any of the foregoing standards as well as others including IEEE 802.16, (WiMax), High Speed Packet Access (HSPA), Long Term Evolution (LTE), 4G, 5G, and others, collectively called "conventional" standards in this document. An OFDM WiFi standard refers to an IEEE 802.11 WiFi standard that operates using OFDM.

IEEE 802.11 standards include the following variants: 802.11b using a 2.4 GHz band, direct sequence spread spectrum, 11 megabits per second (Mbps), carrier sense multiple access (CSMA) with collision avoidance (CA), and has a low efficiency MAC (20%); 802.11a/g with a 802.11a using a 5 GHz band, orthogonal frequency division multiplexing (OFDM), single streams, 54 Mbps, CSMA-CA, and a low efficiency MAC (20%); 802.11g using a 2.4 GHz band, OFDM, single streams, 54 Mbps, CSMA-CA, a low efficiency MAC (20%); 802.11n using a 2.4/5 GHz band, up to 4 streams, 600 Mbps, OFDM, a hi-efficiency MAC (80%); 802.11ac using a 2.4/5 GHz band, up to 8 streams, multi-user multiple input multiple output (MU-MIMO), more than 1000 Mbps, a hi-efficiency MAC (80+%); 802.11ad using an unlicensed band around 60 GHz (also called WiGig), 7 Gigabits per sec (Gbps), having applications including wireless displays, distribution of HDTV content (e.g. in residential living rooms), uses same MAC as 11ac with enhancements, and is backward compatible top earlier standards; 802.11af which is similar to 802.11a/g, but uses TV white space; 802.11axxxx; 802.11p is an extension that permits robust data traffic between automobiles (car to car) (V2X).

OTFS is a modulation technique that modulates information bits at first to QAM symbols. These QAM symbols are modulated onto one of a set of two dimensional (2D) orthogonal basis functions that span the bandwidth and time duration of the transmission burst or packet. OTFS defines a modulation domain based on a set of orthonormal basis functions over which we can transmit the information symbols, and over which the information symbols experience a static, time invariant, two-dimensional channel for the duration of the packet or burst transmission. In that modulation domain, the channel coherence time is increased by orders of magnitude and the issues associated with channel fading in the time or frequency domain in SISO or MIMO systems are significantly reduced. In this way, it eliminates the difficulties in tracking time-varying fading, for example in high speed vehicle communications. The two dimensions of OTFS channel or signal representation are delay and Doppler dimensions. A two-dimensional orthogonal transform such as a symplectic Fourier transform, may be used to convert signals from delay-Doppler dimensions to other dimensions (e.g., time-frequency).

The use of signals designed in the delay-Doppler domain and modulated using OTFS increases the coherence time of the channel by orders of magnitude. It simplifies signaling over the channel using well studied AWGN codes over the average channel SNR. More importantly, it enables linear scaling of throughput with the number of antennas in moving vehicle applications due to the inherently accurate and efficient estimation of channel state information (CSI). In addition, since the delay-Doppler channel representation is very compact, OTFS enables massive MIMO and beamforming with CSI at the transmitter for four, eight, and more antennas in moving vehicle applications.

FIG. 2 depicts at 200 a transmitter that may be included in an access point and/or station that supports OFDM WiFi and OTFS WiFi. In some example embodiments, transmitter 200 is operable to provide network communications in accordance with one or more OFDM WiFi standards to a first wireless device, and operable to provide network communications in accordance with OTFS WiFi to a second wireless device at the same time the OFDM WiFi is used to communicate with the first wireless device. In other embodiments, transmitter 200 is operable to provide network communications in accordance with OTFS WiFi and without also supporting OFDM WiFi.

Transmitter 200 receives a stream of data bits at 210. For example, the stream of data bits may be packets of data. At 215, a service field is prepended, tail bits are appended, and padding bits are appended as needed. At 220, the bits from 215 are scrambled. At 225, the scrambled bits may be encoded by a convolutional encoder. At 230, the encoded bits may be grouped into symbols. For example, when four level quadrature amplitude modulation (4 QAM which also may be referred to as QPSK), each symbol may be represent two bits. At 235, the bits grouped into symbols may be interleaved. In some example embodiments, 215, 220, 225, 230, and 235 may be performed in accordance with one or more WiFi standards.

In some example embodiments, the output 237 of interleaver 235 may be directed to modulator mapper 240 for OFDM WiFi communications and/or to OTFS WiFi baseband transmitter 295. For example, when transmitter 200 is configured to operate as a OFDM WiFi transmitter, interleaver 235 may direct the interleaved symbols at 237B to modulator/mapper 240, and when interleaver 235 is configured to operate as an OTFS transmitter, interleaver 235 may direct the interleaved symbols at 237A to OTFS WiFi baseband transmitter 295.

When transmitter 200 is configured for OFDM WiFi, interleaved symbols 237 are mapped and modulated at 240, and four (or another number) pilot tones are inserted into the modulated symbols. At 250, the modulated symbols pass through an inverse fast Fourier transform (IFFT) block to produce another stream of bits. At 255, a cyclic prefix is prepended.

Figure 3:
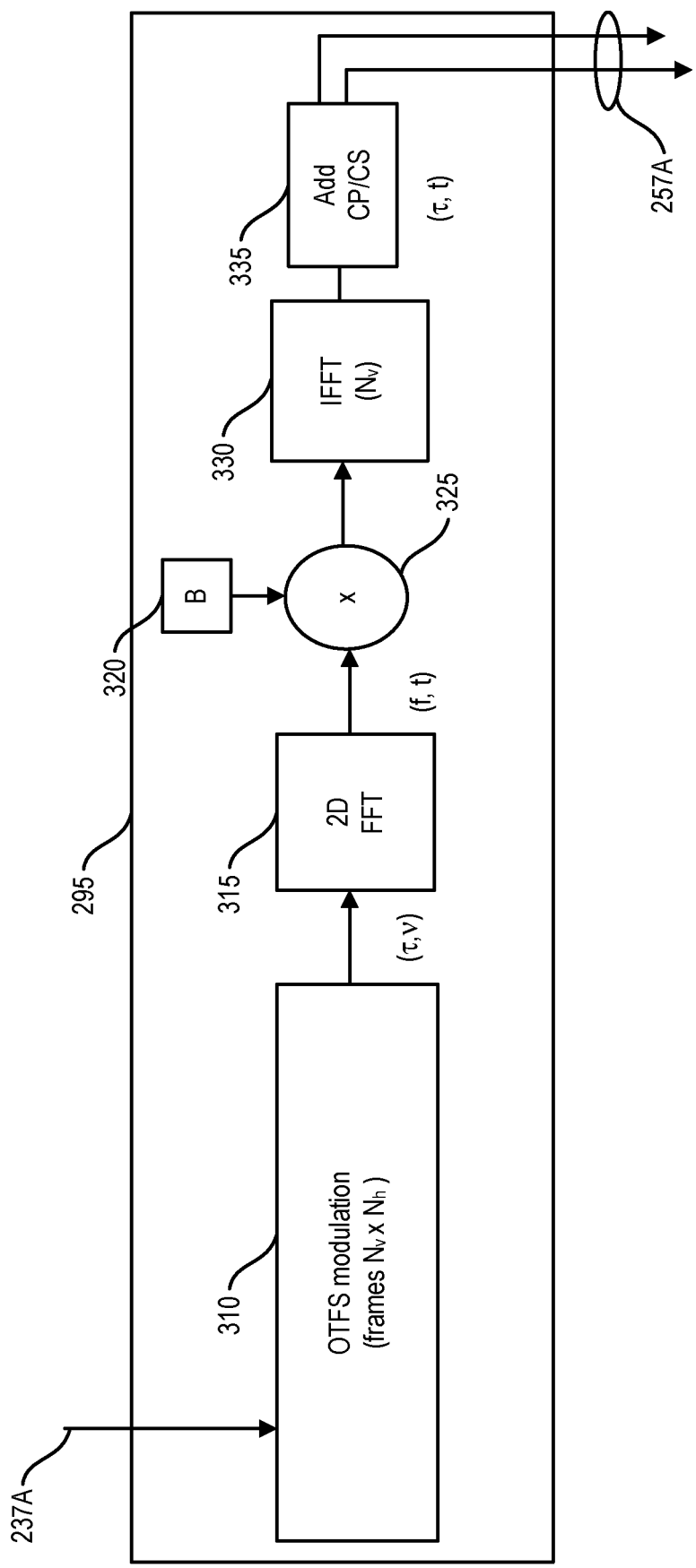
FIG. 3 depicts an example of signal processing features of an OTFS transmitter, in accordance with some example embodiments.

When transmitter 200 is configured for OTFS WiFi, interleaved symbols 237 are further processed by OTFS WiFi baseband transmitter 295 which is further detailed in FIG. 3. Interleaver 235 may include a selection circuit to enable selection passing of output of interleaver 235 to modulator/mapper 240 when configured for a OFDM WiFi signal or 295 when configured for an OTFS WiFi signal.

When configured for OFDM WiFi, the data stream with the prepended cyclic prefix at 255 is provided to a pulse shaping filter at 260. When configured for OTFS WiFi, a data stream from OTFS WiFi baseband transmitter 295 is provided to the pulse shaping filter at 260. Pulse shaping filter 260 may include a selection circuit to enable selection at pulse shaping filter 260 between the output 255 corresponding to a OFDM WiFi signal or 295 corresponding to an OTFS WiFi signal. After pulse shaping, DAC 265 converts the digital data streams into voltages/currents. DAC 265 is clocked by an oscillator 270. The clock rate may be any clock rate. Mixer 275 may upconvert the output of DAC 265 to a higher frequency that is amplified by power amplifier 285 and transmitted via antenna 290.

FIG. 3 depicts OFTS WiFi baseband transmitter 295, in accordance with some example embodiments. When interleaved bits are selected to be provided at 237A to OTFS baseband transmitter 295, the interleaved bits enter OTFS modulator 310. OTFS modulator 310 may convert the interleaved bits to symbols such as QAM symbols. For example, when QAM 4 is used, two bits are mapped to each QAM 4 symbol. The symbols may be arranged in frames arranged as Nv×Nh matrices. One Nv×Nh matrix may correspond to an OTFS symbol. The symbols may be read into the matrix by row or by column. At 315, an OTFS symbol or one matrix may be processed by two-dimensional (2-D) fast Fourier transformer (FFT) 315. In some example embodiments, each OTFS symbol in a Nv×Nh matrix may be referred to as being in the $(\tau,v)$ domain or the delay and Doppler domain. The output of the two-dimensional transformer may be referred to as the (f,t) domain, or the frequency and time domain. The resulting samples from 315 may be multiplied at 325 by a sequence 320 labeled as "B." Sequence 320 may be a Zadoff-Chu sequence, or other sequence including a pseudo noise (PN) sequence. In some example embodiments, sequence 320 may not be used and multiplier 325 may be removed. In other embodiments, the effect of sequence B may be negated by forcing all bit values in 320 to be "1." One dimensional (1D) inverse FFT 330 is applied to the samples out of 325. A cyclic prefix and cyclic suffix (CP/CS) is applied at 335 to the output of 330. The resulting samples are serialized and provided to pulse shaping filter 260 via 257A.

Figure 4:
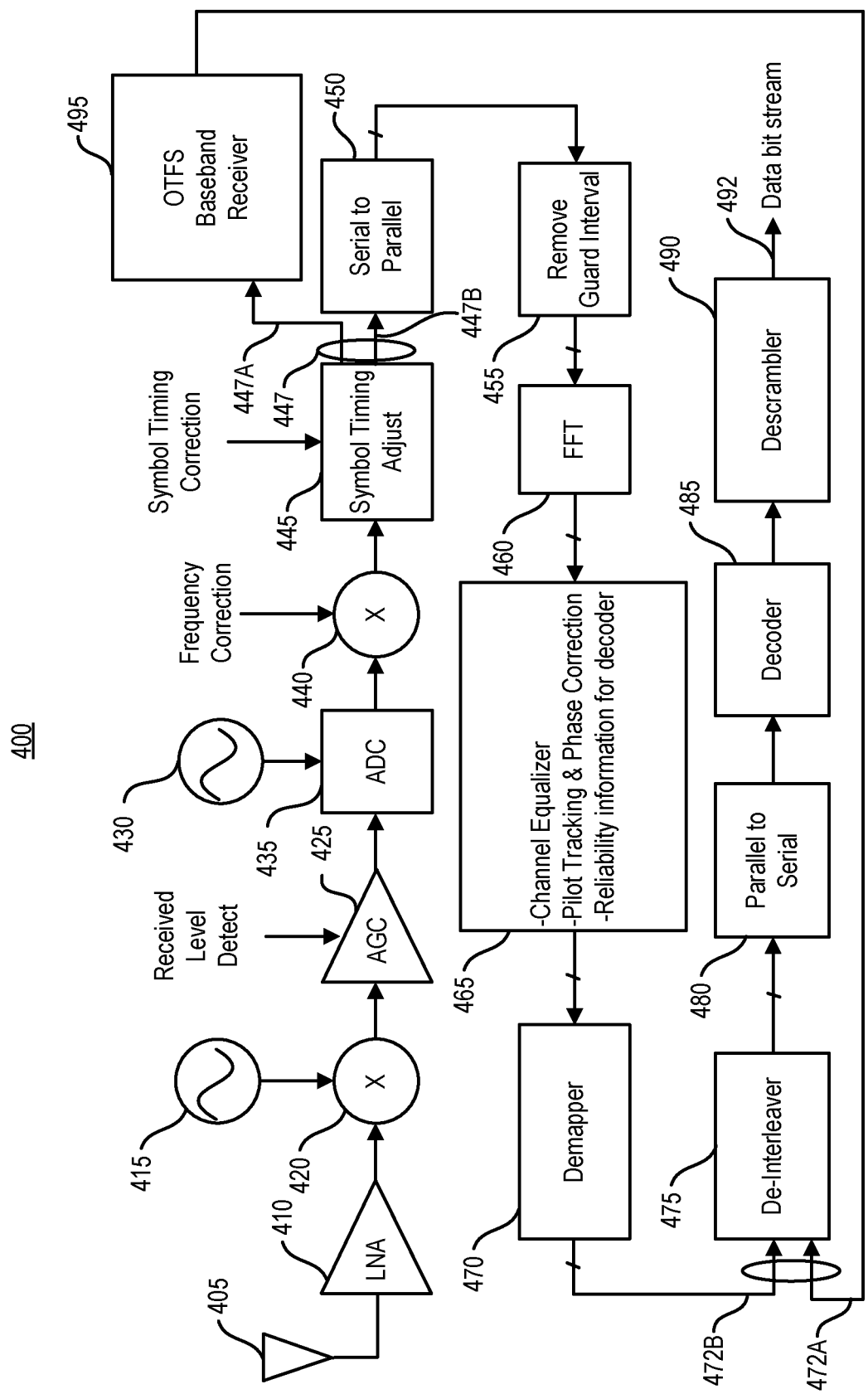
FIG. 4 depicts an example of a WiFi with OTFS receiver, in accordance with some example embodiments.

FIG. 4 depicts an OTFS WiFi receiver 400 that may be included in an access point and/or station that supports OFDM WiFI and OTFS WiFi. In some example embodiments, receiver 400 is operable to provide network communications in accordance with one or more OFDM WiFi standards to a wireless device, and operable to provide network communications in accordance with OTFS WiFi to another wireless device at the same time. In other embodiments, receiver 400 is operable to provide network communications in accordance with OTFS WiFi without supporting OFDM WiFi.

Receiver 400 receives a transmitted signal via antenna 405 which is amplified by low-noise amplifier (LNA) 410. The output of LNA 410 is downconverted by mixer 420 using local oscillator 415. The output of mixer 420 is adjusted in amplitude by automatic gain control (AGC) 425. The output of AGC 425 is digitized by analog-to-digital converter 435 which is clocked by clock 430. A digital frequency correction may be applied by multiplier/mixer 440. Symbol timing may be adjusted at 445. The output from 445 may be passed at 447A to OTFS WiFi baseband receiver 495 or to OFDM WiFi receiver at 447B.

When OFDM WiFi signal processing is selected, the output of 445 may be passed at 447B to serial to parallel converter 450 followed by guard interval remover 455, FFT 460, channel equalizer 465 including pilot tracking and phase correction, and demapper 470. When OFDM WiFi is selected for receiver 400, the output of demapper 470 is provided to de-interleaver 475. De-interleaver 475 is provided to parallel to serial converter 480, decoder 485, and descrambler 490 to provide OFDM WiFi bit stream 492.

When OTFS WiFi signal processing is selected, the output of 445 may be provided to OTFS WiFi baseband receiver 495. The output of 495 may be provided to de-interleaver 475 at 472A and de-interleaver 475 may not process the OFDM WiFi output of demapper 470. In some example embodiments, signals 447 and 472 may be selected to pass to 447A and 472A for OTFS WiFi processing, or selected to pass 447B and 472B for OFDM WiFi processing.

Figure 5:
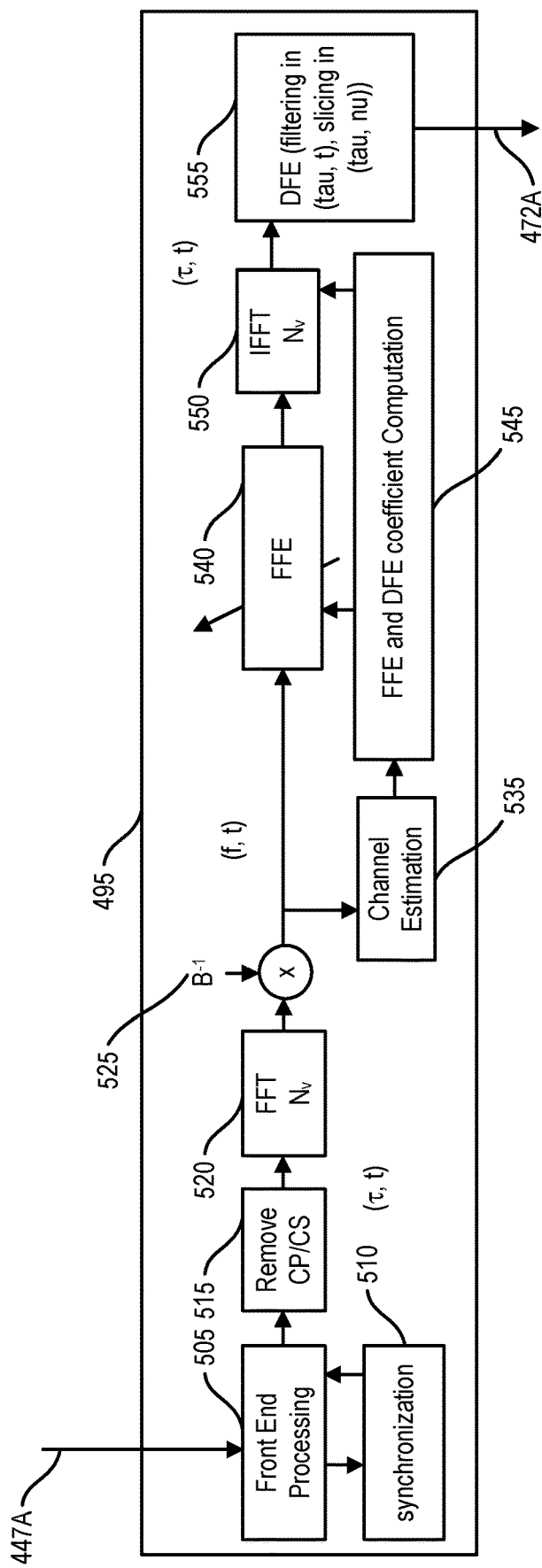
FIG. 5 depicts an example of signal processing features of an OTFS receiver, in accordance with some example embodiments.

FIG. 5 depicts OFTS WiFi baseband receiver 495, in accordance with some example embodiments. When OTFS WiFi signal processing is selected, the output of symbol timing adjustment 445 is provided at 447A to front-end processing 505 in OTFS baseband receiver 495. Front-end processing may include synchronization 510. A cyclic prefix and/or a cyclic suffix may be removed at 515. At 520, a 1D FFT may be performed on the output of 515. At 525, the inverse of the spreading sequence 320 applied at the transmitter is applied to the received bits. The output of 530 may be referred to as in the frequency-time or (f,t) domain. Channel estimation may be performed at 535 followed by feed-forward equalizer (FFE) and decision feedback equalizer (DFE) coefficient computations at 545. The output of multiplier 530 may be provided to FFE 540 followed by 1D inverse FFT 550. The output of IFFT 550 may be referred to as being in the $(\tau, \text{nu})$ domain. The resulting samples may be provided to decision feedback equalizer (DFE) 555 and then to de-interleaver 475 via 472A.

Figure 6A:
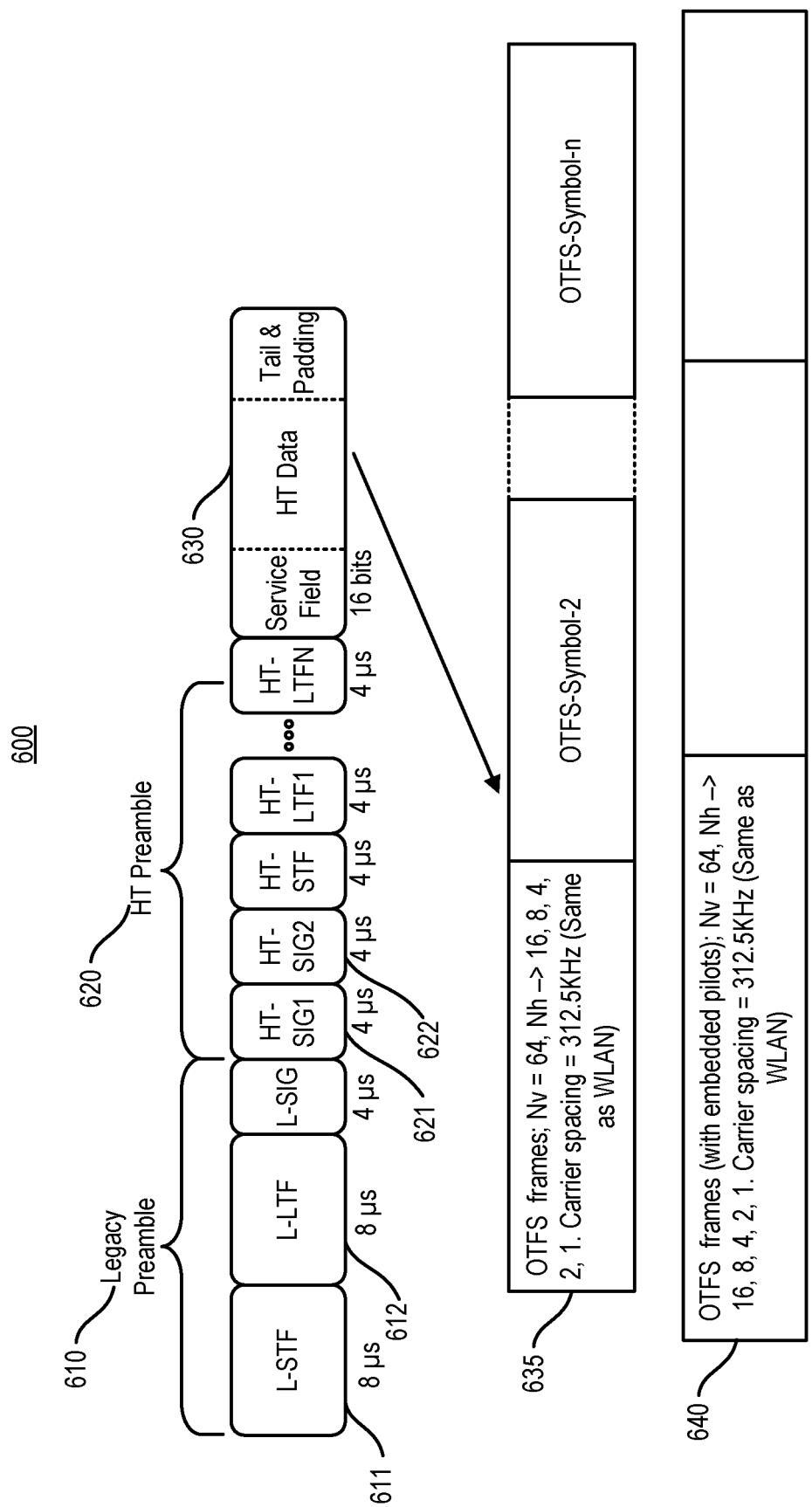
FIG. 6A depicts an example of a frame of data including a preamble and payload data, in accordance with some example embodiments.

FIG. 6A depicts an example of an OFDM WiFi (e.g., IEEE 802.11n) preamble with OTFS symbols or OFDM symbols including payload data following the preamble. The OFDM preamble may be used in a conventional way by a first wireless device for communication using OFDM WiFi with a second wireless device. In some embodiments, the preamble may be used in a different way to indicate OTFS WiFi is being used for communication as detailed below. A conventional IEEE 802.11n preamble, in mixed mode, includes legacy preamble 610 and high throughput preamble 620. When used for OFDM WiFi, the conventional preamble is used as defined in the 802.11 standard. At 610, a legacy preamble may include a legacy short timing field (L-STF) and a legacy long timing field (L-LTF). At 620, a high throughput (HT) preamble is shown with a series of segments from HT-SIG1 to HT-SIGN, where N is a positive integer greater than one. The value N may depend on the number of MIMO signals. High throughput data is depicted at 630. When OFDM WiFi is used, high throughput (HT) data 630 is modulated according to OFDM WiFi. When OTFS WiFi is used, the HT preamble 620 is used in a way not defined in the 822.11n standard. For example, bit values in HT-SIG 1 and/or HT-SIG 2 not defined in the 802.11n standard may be used to indicate OTFS WiFi using OTFS modulation is used on the HT data. HT data 630 is modulated according OTFS WiFi as shown at 635 and/or 640 and may include one or more OTFS symbols. At 635, a static channel scenario is depicted, where the channel is to be static and the channel estimation performed from the preamble is not changing or changes little in the entire data burst. The OTFS symbol in 635 is populated with data. At 640, the channel may not be stationary and the channel estimations from the preamble may be changing across different OTFS data frames. In this case, pilot symbols may be inserted into the data frames. The pilots can be inserted into every OTFS frame, alternating frames, or, more generally, as often as the channel non-stationarity warrants. The received pilot symbols can be used for channel estimation on the respective OTFS symbols. These channel estimates can be used for updating the equalizer coefficients. Thus, OTFS WiFi can be configured to work in non-static environments. In some embodiments, a non-static environment may slightly reduce the data throughput.

To improve the coverage or extend the range of communications, the following process may be performed. One or more OTFS symbols may be populated with a reduced number of QAM symbols where each QAM symbol has a higher energy. Any empty slots in the OTFS frame may be filled with zeros. The QAM symbols may be spread within the entire OTFS frame. Spreading can be done in the (Delay, Doppler) plane or (time frequency) plane. The energy of each QAM symbol may be selected so that the average energy after spreading of the OTFS symbol meets a spectral mask of WiFi. Since the number of populated QAM symbols per frame is reduced, the energy per QAM symbol can be increased while meeting the spectral mask. Even if the received power is low, after de-spreading at the receiver, reduced number of QAM symbols will have greater energy determined by the chosen spreading gain and will be detected more reliably. The range/coverage can be extended in this way.

Each OTFS symbol may be representative of a frame of data loaded into a Nv×Nh matrix as described above. Nv and Nh may each have predetermined values. Some example values include Nv=64 and Nh=16, 8, 4, 2, or 1. In an example embodiment, Nv=64, Nh=16, and QAM 4 modulation may be used. A corresponding symbol may include 64×16×2 (bits/symbol for QPSK)=2048 bits per OTFS symbol. In some example embodiments, Nh may be adjusted for different packet sizes, embedded pilots may be used for mobility, and/or Nh=1 for internet of things (IOT) applications.

Figure 6B:
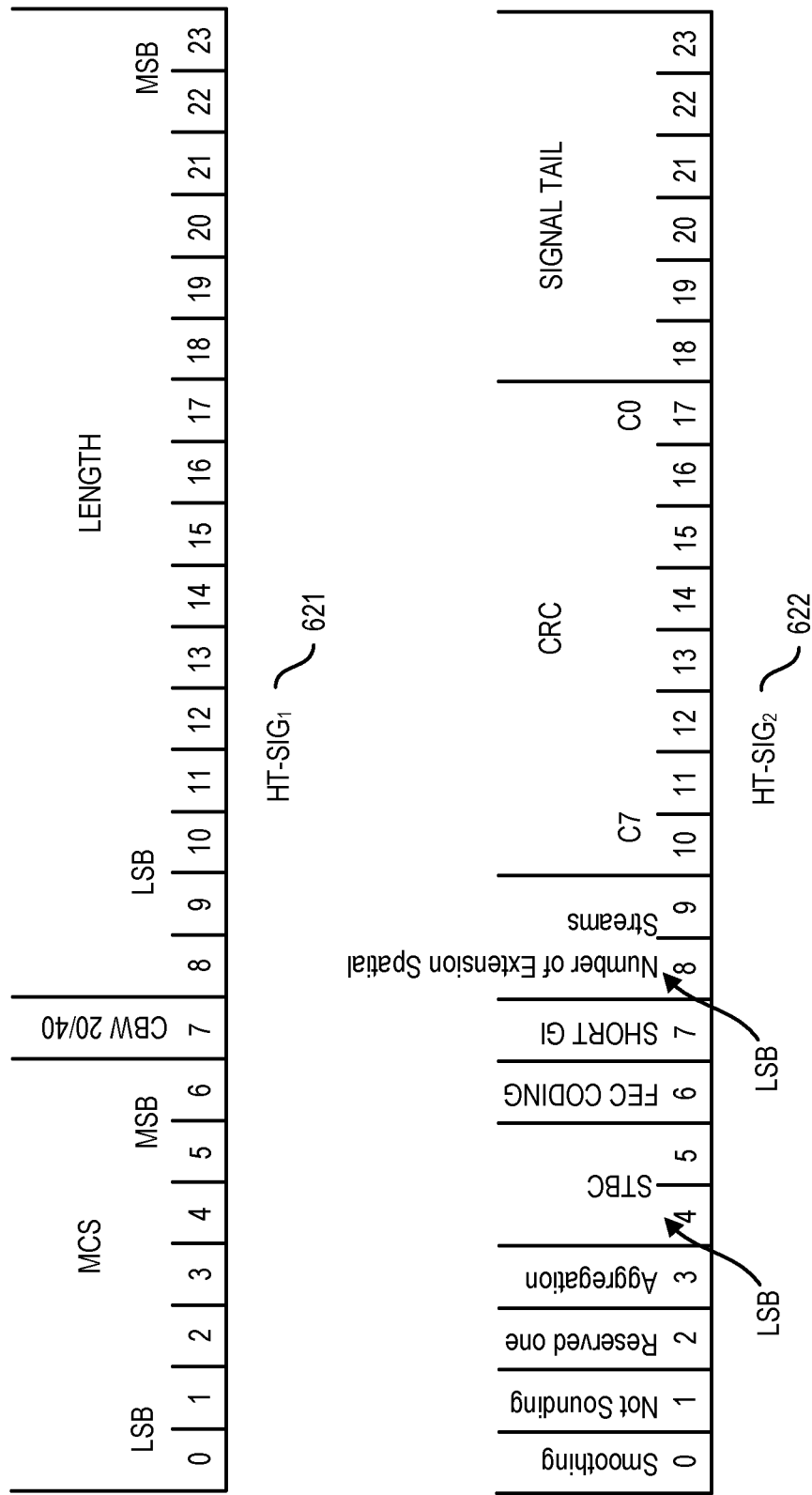
FIG. 6B depicts examples of two segments of a preamble, in accordance with some example embodiments.

FIG. 6B depicts preamble segments HT-SIG 1 and HT-SIG 2. HT-SIG 621 includes bits 0-6 to specify the modulation and coding scheme (MCS) used for the high throughput payload data, bit 7 to specify whether the channel bandwidth is 20 MHz or 40 MHz, and bits 8-23 to specify the number of bytes in a data packet. HT-SIG 2 622 includes bits for smoothing, not sounding, a reserved bit, and aggregation. HT-SIG 2 also includes bits 4-5 to specify space time block coding where three of the four possible values (e.g., 00, 01, 10, 11) are used in OFDM WiFi. In some example embodiments, a combination of bits 4-5 that are unused (e.g., 11) in OFDM WiFi may be used to indicate that OTFS modulation is used. In another example embodiment, one or more reserved bits can be used for this purpose. In other embodiments, other combinations of bit values in 621 and/or 622 may be used to indicate that OTFS modulation is used on one or more frames associated with the preamble.

Figure 7A:
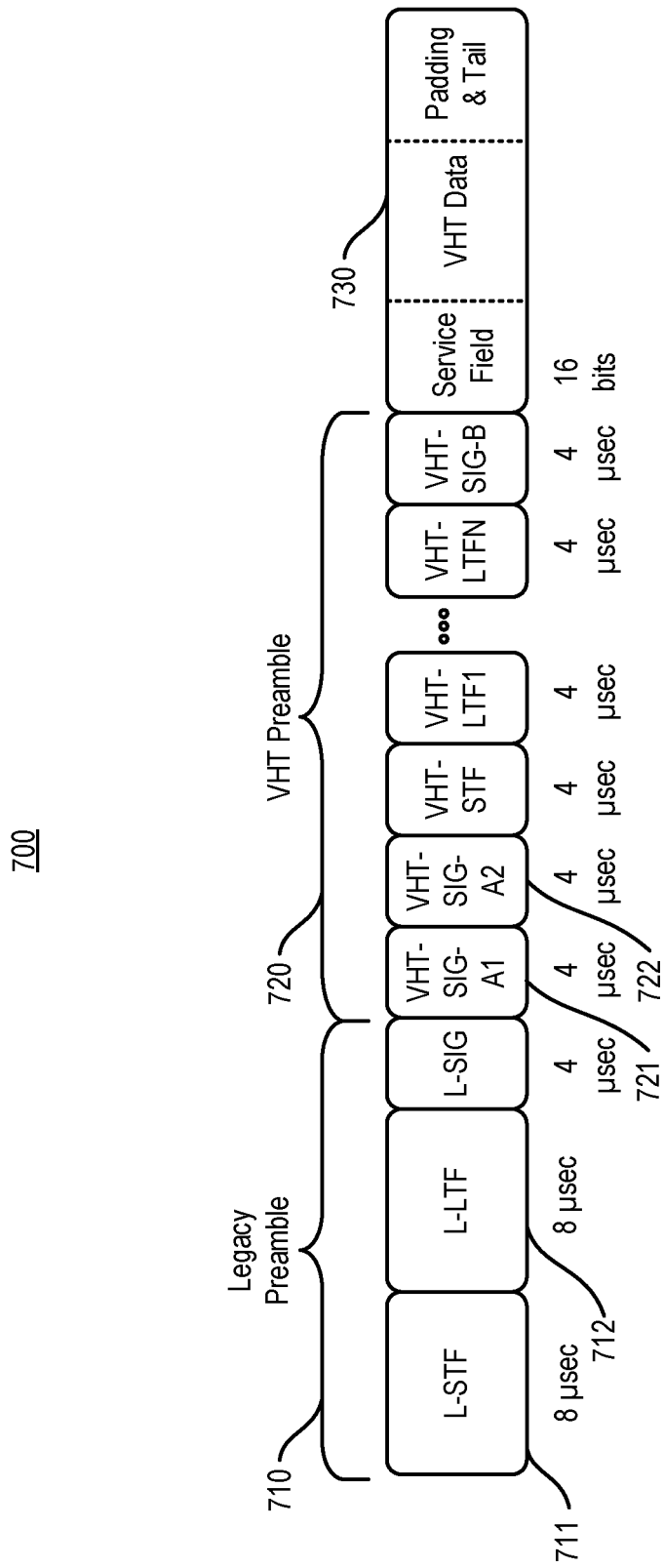
FIG. 7A depicts another example of a frame of data including a preamble and payload data, in accordance with some example embodiments.

FIG. 7A depicts an example of an OFDM WiFi (e.g., IEEE 802.11ac) preamble with OTFS symbols or OFDM symbols including payload data following the preamble. The OFDM preamble may be used in a conventional way by a first wireless device for communication using OFDM WiFi with a second wireless device. In some embodiments, the preamble may be used to indicate OTFS WiFi is being used for communication as detailed below. A conventional IEEE 802.11ac preamble includes legacy preamble 710 and very high throughput (VHT) preamble 720. When used for OFDM WiFi, the conventional preamble is used as defined in the 802.11ac standard. At 710, a conventional IEEE 802.11ac preamble may include a legacy short timing field (L-STF) and a legacy long timing field (L-LTF). At 720, a very high throughput (VHT) preamble is shown with a series of segments including VHT-SIG-A1, VHT-SIG-A2, VHT-STF, VHT-LTF1 to VHT-LTFN where N is a positive integer greater than one, and VHT-SIGB. The value N may depend on the number of MIMO signals. Very high throughput data is depicted at 730. When OFDM WiFi is used, very high throughput (VHT) data 730 is modulated according to OFDM WiFi. When OTFS WiFi is used, the VHT preamble 720 is used in a way not defined in the 822.11ac standard. For example, bit values in VHT-SIG-A1 and/or VHT-SIG-A2 not defined in the 802.11ac standard may be used to indicate OTFS WiFi using OTFS modulation is used on the VHT data. When OTFS WiFi is used, VHT data 730 is modulated OTFS WiFi and may include one or more OTFS symbols. Each OTFS symbol may be representative of a frame of data loaded into a Nv×Nh matrix as described above.

Figure 7B:
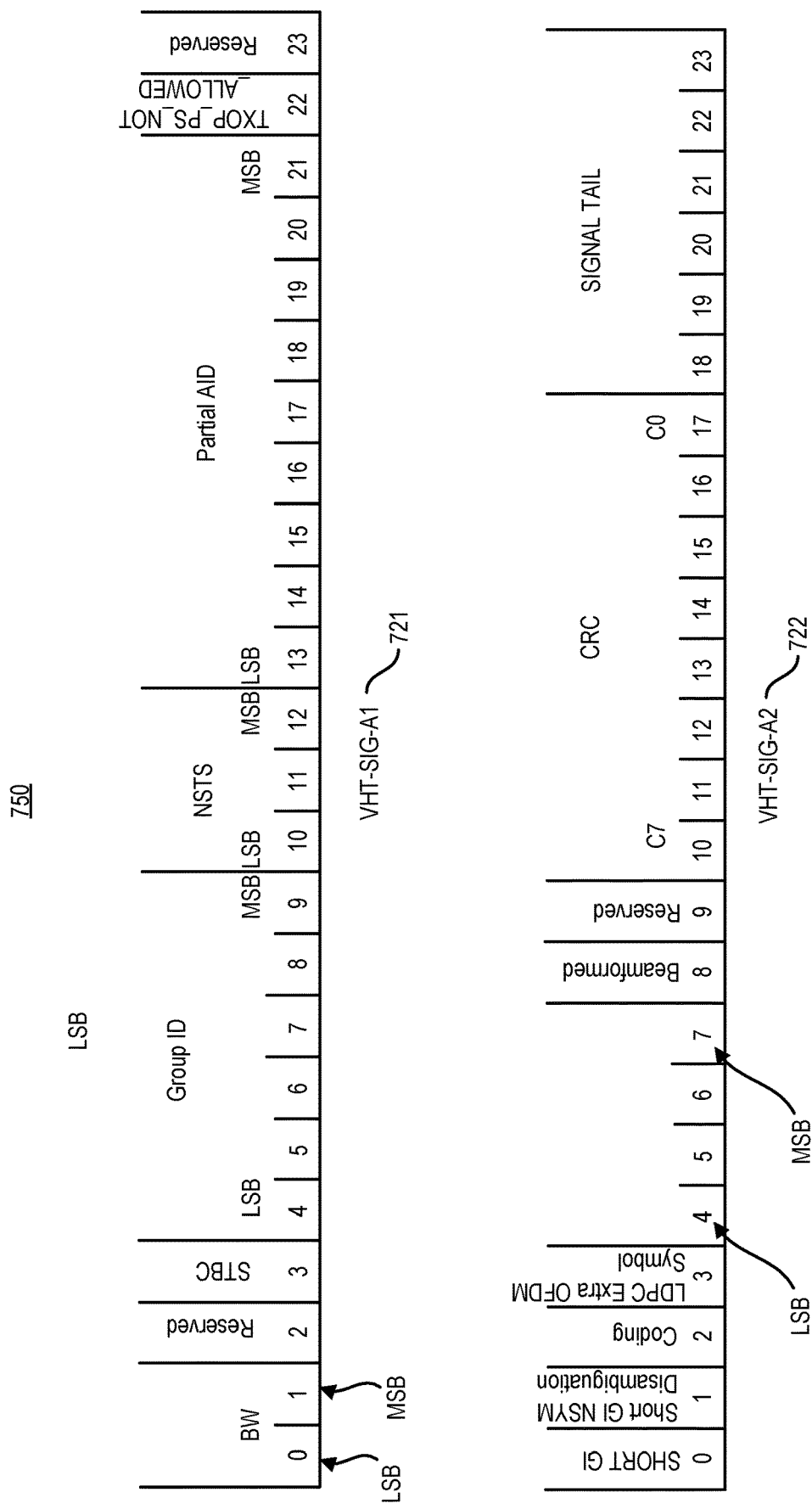
FIG. 7B depicts other examples of two segments of a preamble, in accordance with some example embodiments.

FIG. 7B depicts preamble segments VHT-SIG-A1 and VHT-SIG-A2. VHT-SIG-A1 721 includes bits 0-1 to specify whether the channel bandwidth, as well as other bits. VHT-SIG-A2 722 includes bits 4-7 to specify the modulation and coding scheme (MCS) as well as other bits. OTFS modulation may be indicated by the value of one or more bits in 721 and/or 722. For example, a combination of bits in VHT-SIG-A1 721 such as bit 2, bit 23, and/or VHT-SIG-A2 722 such as bit 9 may indicate that OTFS modulation is used on one or more frames associated with the preamble.

Figure 8:
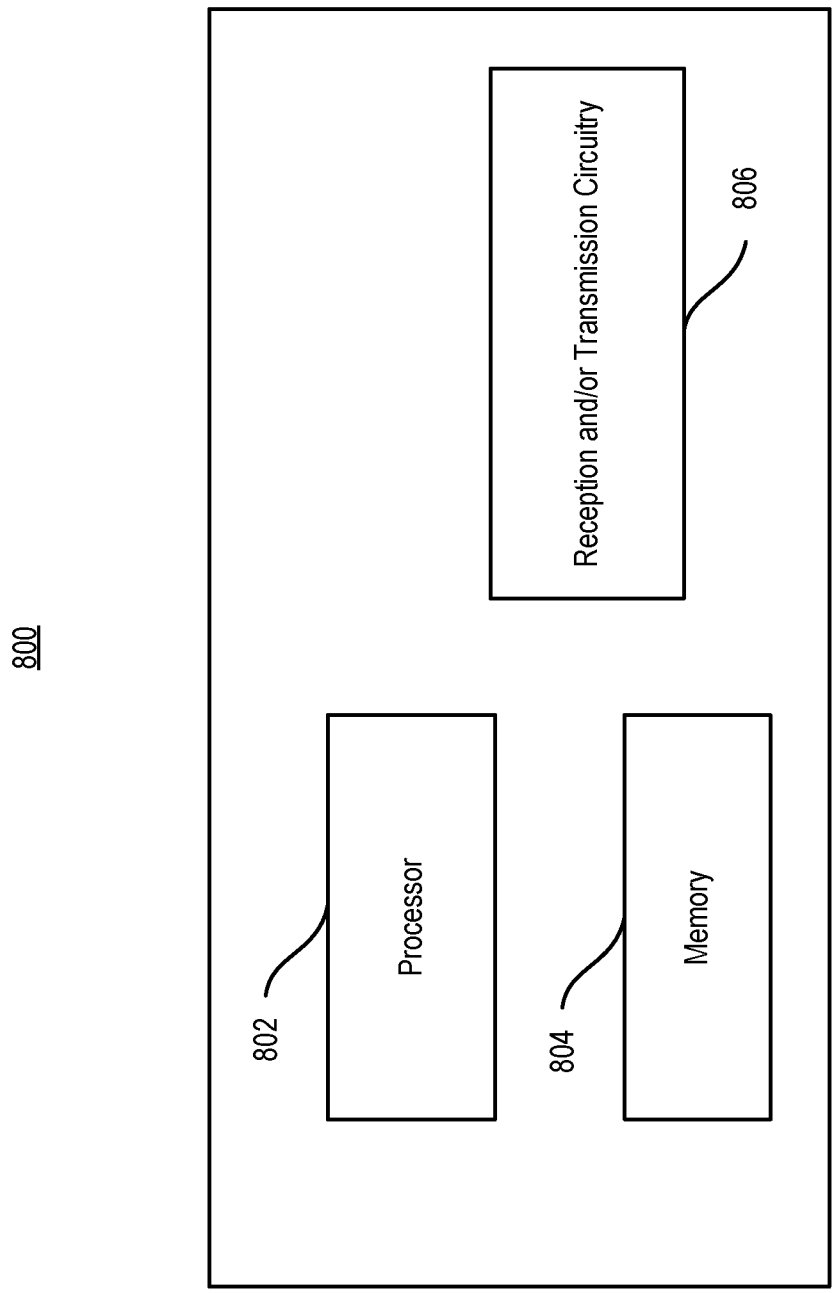
FIG. 8 depicts an apparatus, in accordance with some example embodiments.

FIG. 8 depicts an example of a wireless transceiver apparatus 800. The apparatus 800 may be used to implement methods disclosed herein in the access points or the stations disclosed above. The apparatus 800 includes a processor 802, a memory 804 that stores processor-executable instructions and data during computations performed by the processor. The apparatus 800 includes reception and/or transmission circuitry 806, e.g., including radio frequency operations for receiving or transmitting signals. For example, various embodiments of the reception or transmission circuitry 806 are depicted in FIGS. 2 to 5.

Figure 9:
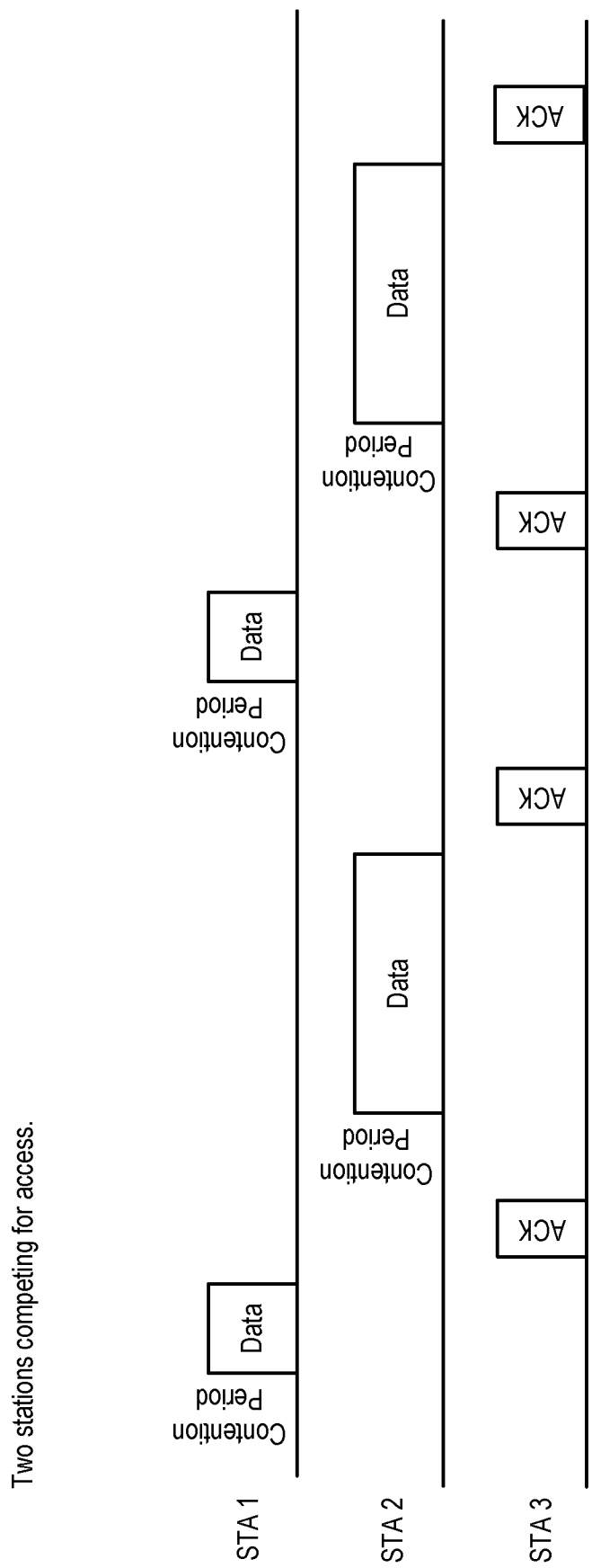
FIG. 9 depicts a timing diagram showing three stations sharing a medium.

FIG. 9 depicts a timing diagram showing three stations sharing a channel. Shown in FIG. 9 is a timeline showing communications using a shared channel being shared by station 1 (STA 1), station 2 (STA 2) and station 3 (STA 3). Each station uses the channel at a different time. Before data is sent, a there is a contention period. The data sent by different stations may use the channel for different lengths of time. A station may also not send any data but occasionally send acknowledgement messages (ACK).

Figure 10:
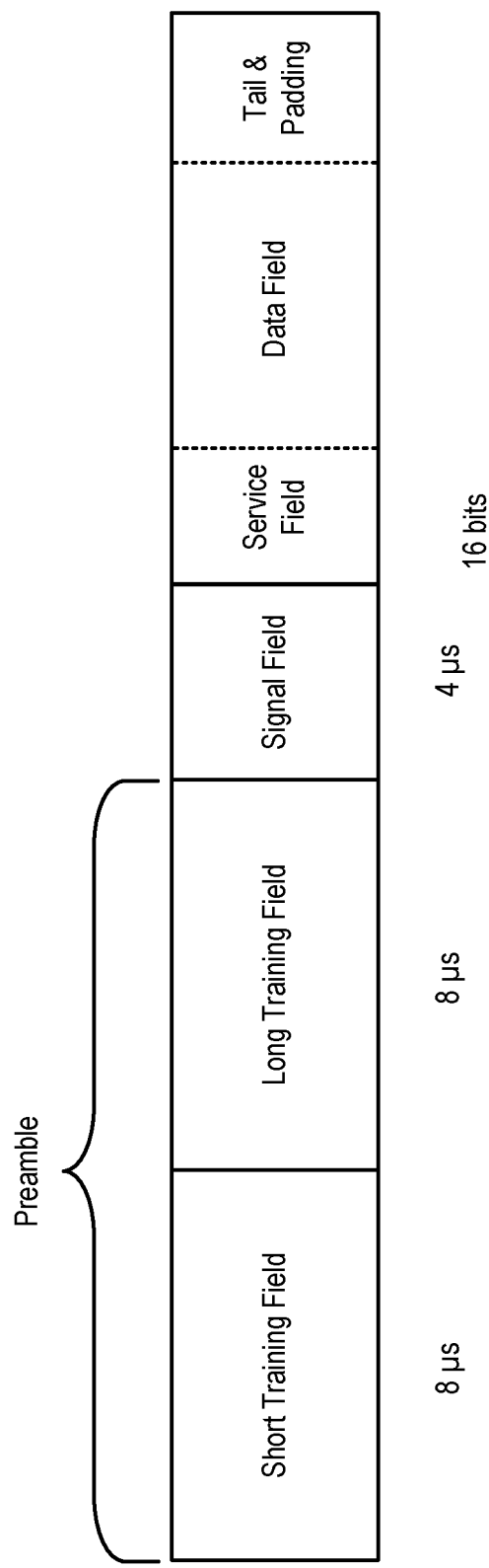
FIG. 10 depicts a frame for IEEE 802.11a/g including training frames and a signal field.

FIG. 10 depicts a frame for IEEE 802.11a/g including training frames and a signal field. In the example of FIG. 10, the frame includes a short training field for 8 microseconds (8 μs), a long training field for 8 μs, a signal field for 4 μs, a service field which is 16 bits long, a data field, and a tail and padding field. The short training field may be used for automatic gain control (AGC), timing and carrier synchronization. The long training field may be used for channel estimation. Th signal field may be used for physical layer encoding details for the data frame.

FIG. 11 depicts physical layer encoding for a data frame. FIG. 11 shows a rate bit field, a corresponding data rate, a modulation associated with each rate bit field permutation, and an associated code rate. The rate bit field with four bits may be included in a field of bits shown.

Figure 12:
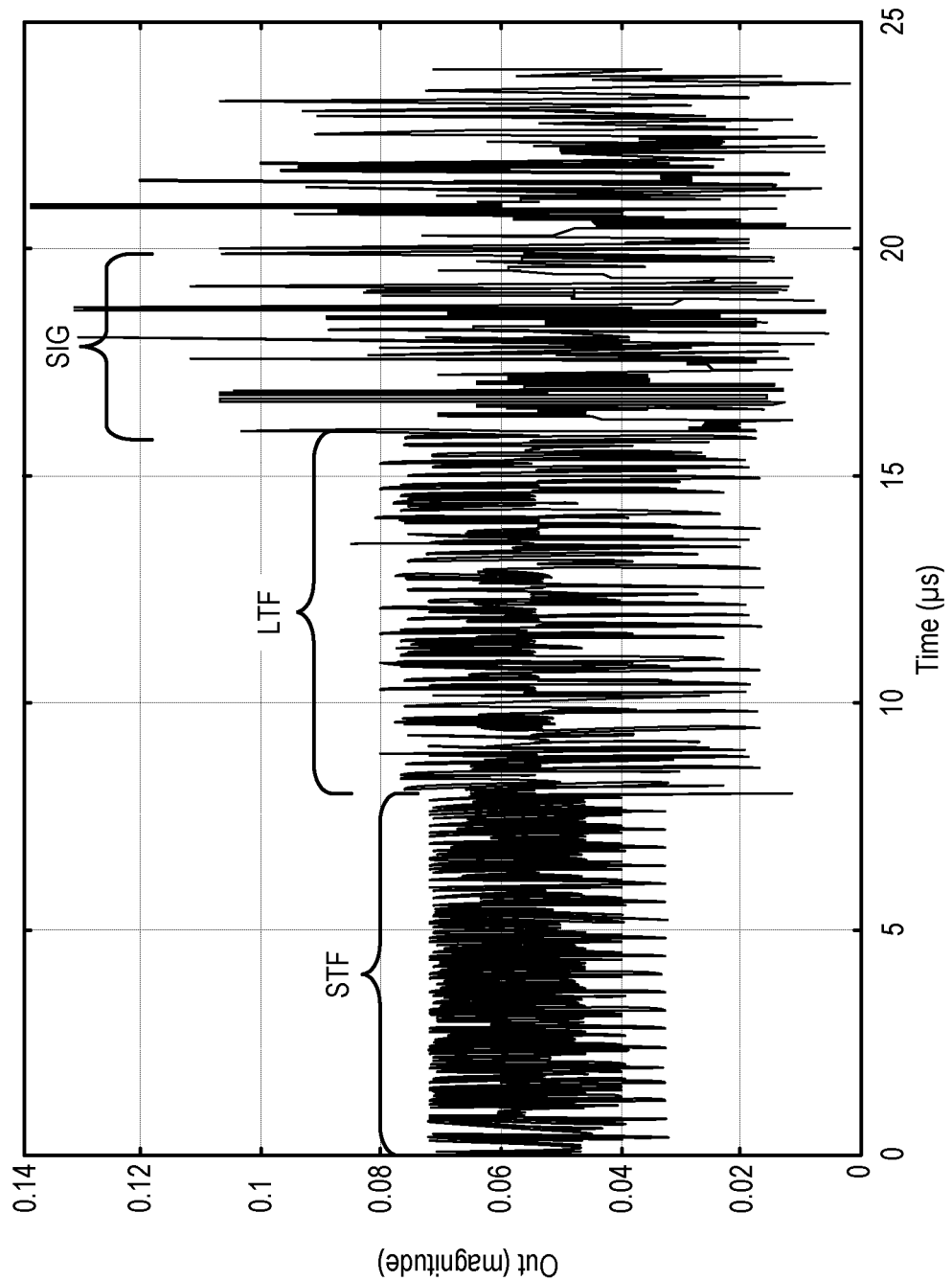
FIG. 12 depicts an example plot of a IEEE 802.11a/g waveform.

FIG. 12 depicts an example plot of a IEEE 802.11a/g waveform. Sections of the waveform over time include a short training field (STF), a long training field (LTF), and signal field (SIG). The graph uses time as the horizontal axis and output magnitude as the vertical axis.

Figure 13:
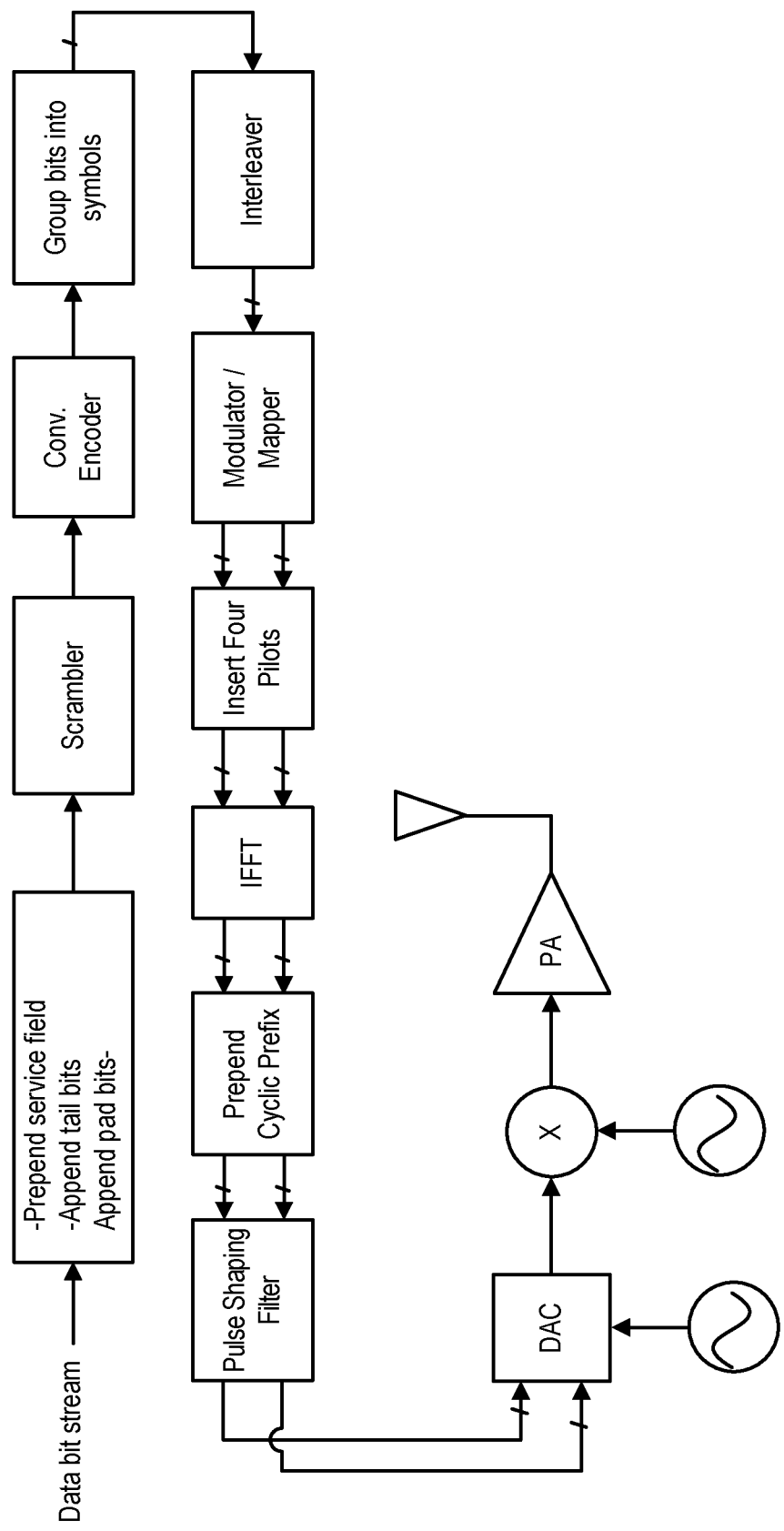
FIG. 13 depicts an example of an IEEE 802.11a/g transmitter bock diagram.

FIG. 13 depicts an example of an IEEE 802.11a/g transmitter bock diagram. The transmit signal may be single input single output (SISO) signal. A service field is prepended, trail bits are appended, and padding bits appended to an input data bit stream. The resulting bit stream is scrambled, convolutionally encoded, and bits a grouped into symbols. The symbols are interleaved, and the modulated. Interleaving may include interleaving bits within a symbol and/or interleaving bins within an OFDM frame. Four pilots are inserted, and an inverse fast Fourier transform (IFFT) is performed. A cyclic prefix is prepended, and a pulse shaping filter applied. The resulting bit stream is converted to an analog signal via a digital to analog converter (DAC) followed by up conversion and power amplification (PA).

Figure 14:
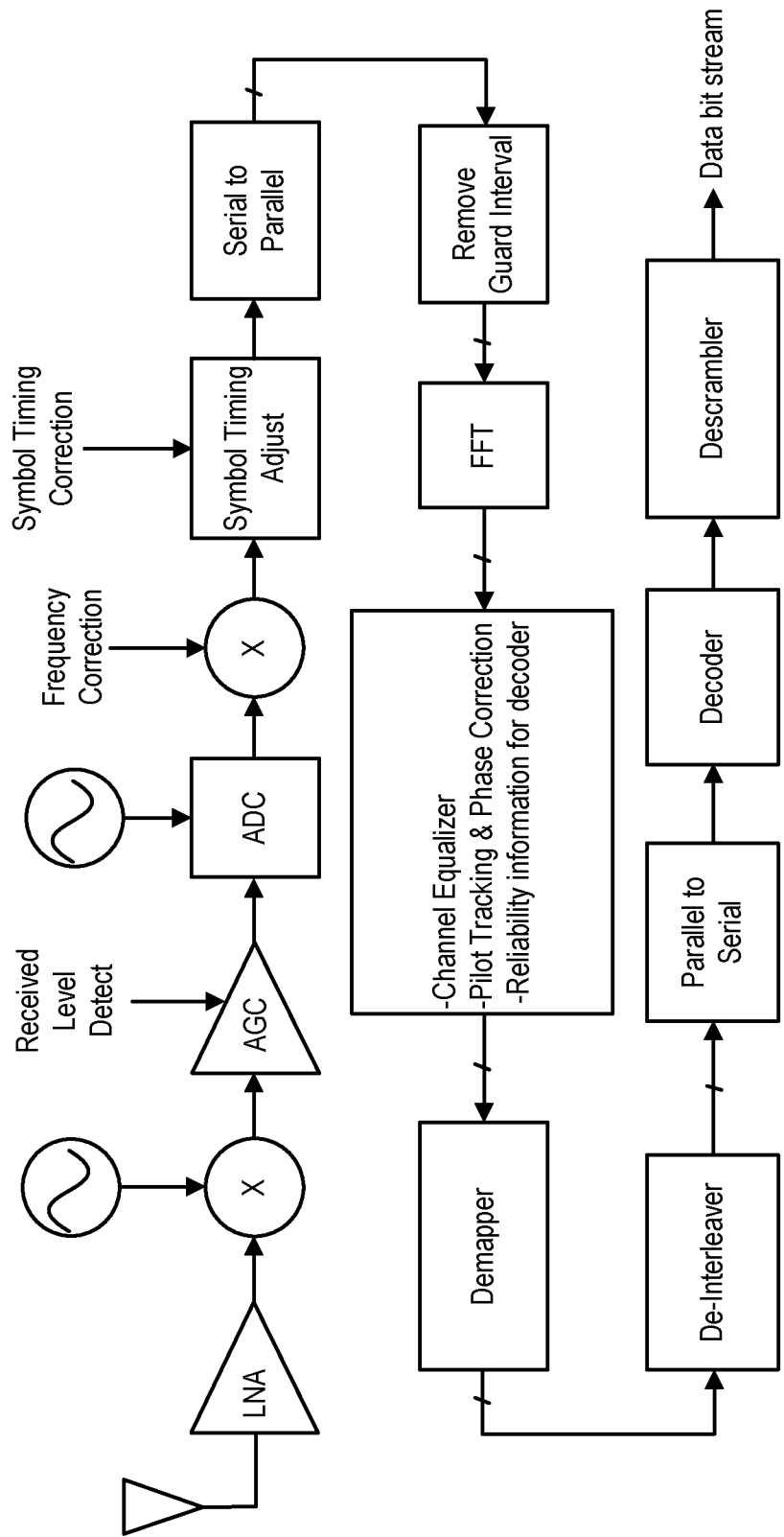
FIG. 14 depicts an example of an IEEE 802.11a/g receiver bock diagram.

FIG. 14 depicts an example of an IEEE 802.11a/g receiver bock diagram. An antenna receives a transmitted signal, the signal is amplified by a low noise amplifier (LNA), down converter, passed through an amplifier with automatic gain control (AGC), and then digitized by an analog to digital converter (ADC). A frequency correction to the digitial output of the ADC is applies, symbol timing is adjusted, and the digitized signal is converted form being serial to parallel. Guard intervals are removed, and a fast Fourier transform (FFT) is performed on the digital signal. A channel equalizer is applied, pilot tracking and phase correction is performed, and reliability information is determined for a decoder. The signal is passed through a demapper to generate received bits that are then de-interleaved, converted back to a serial signal, decoded, and descrambled to produce a data bit stream. Two or more bins may be dedicated in each OFDM symbol for phase tracking (synchronization).

Figure 15:
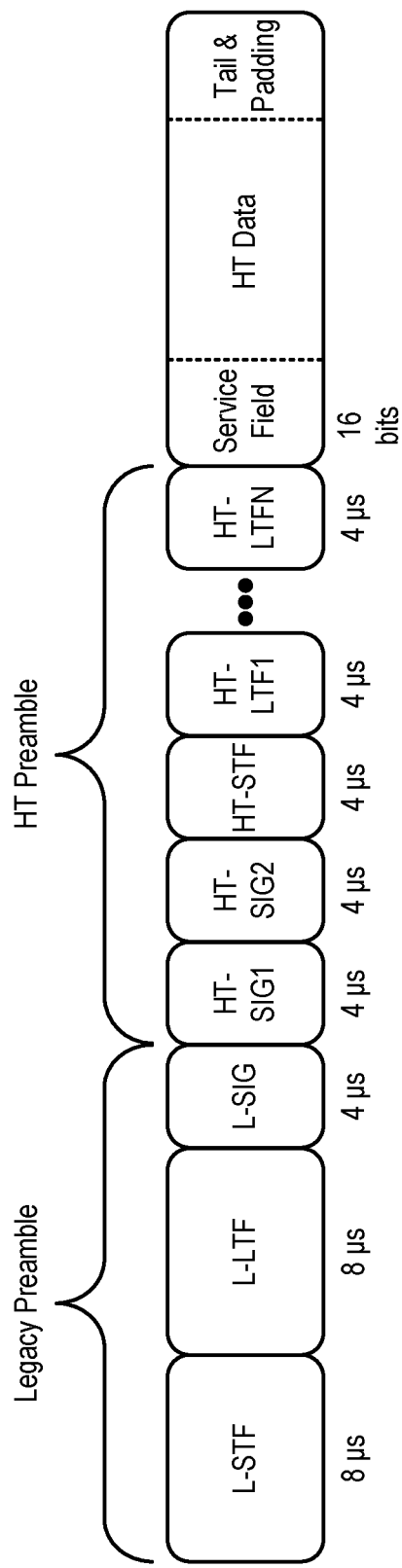
FIG. 15 depicts an example of an IEEE 802.11n high throughput preamble.

FIG. 15 depicts an example of an IEEE 802.11n high throughput preamble. The preamble is to a frame that is a mixed frame. The preamble includes a legacy preamble and a high throughput (HT) preamble followed by a service field, high throughput (HT) data and tail and padding bits. Legacy devices will fail to demodulate the HT-Sig1 field and will consequently stop demodulating thereby allowing legacy and high throughput signals to coexist.

Figure 16:
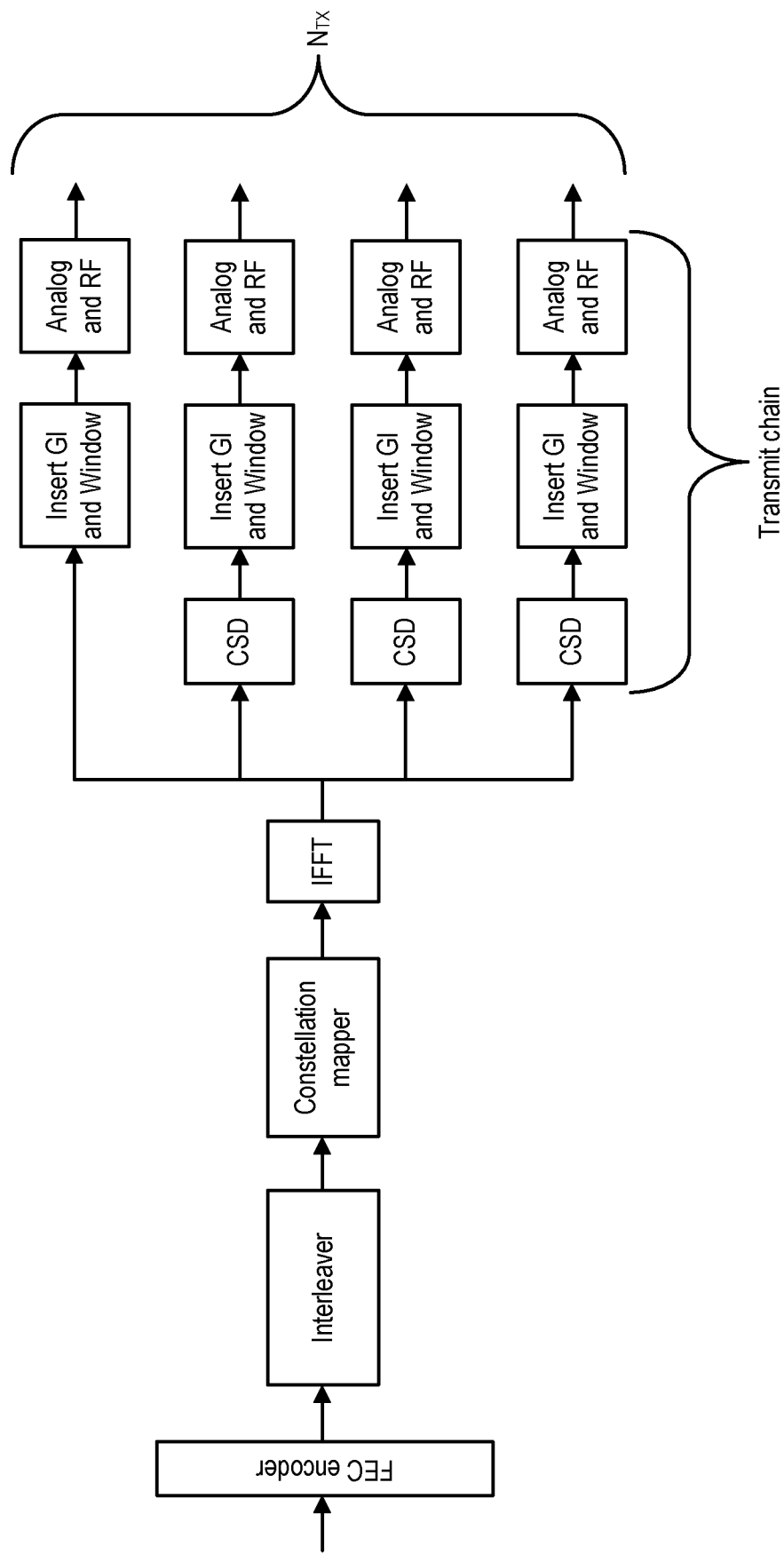
FIG. 16 depicts an example of an IEEE 802.11n transmitter bock diagram.

FIG. 16 depicts an example of an IEEE 802.11n transmitter bock diagram. The transmitter includes cyclic shift diversity (CSD). In the transmitter, input data bits enter a forward error correction (FEC) encoder, the encoded bits are interleaved, mapped to a constellation, and a IFFT is performed. The IFFT feeds parallel transmit chains. Each chain inserts a guard interval (GI) and window. All chains except for one, also include a CSD block.

Figure 17:
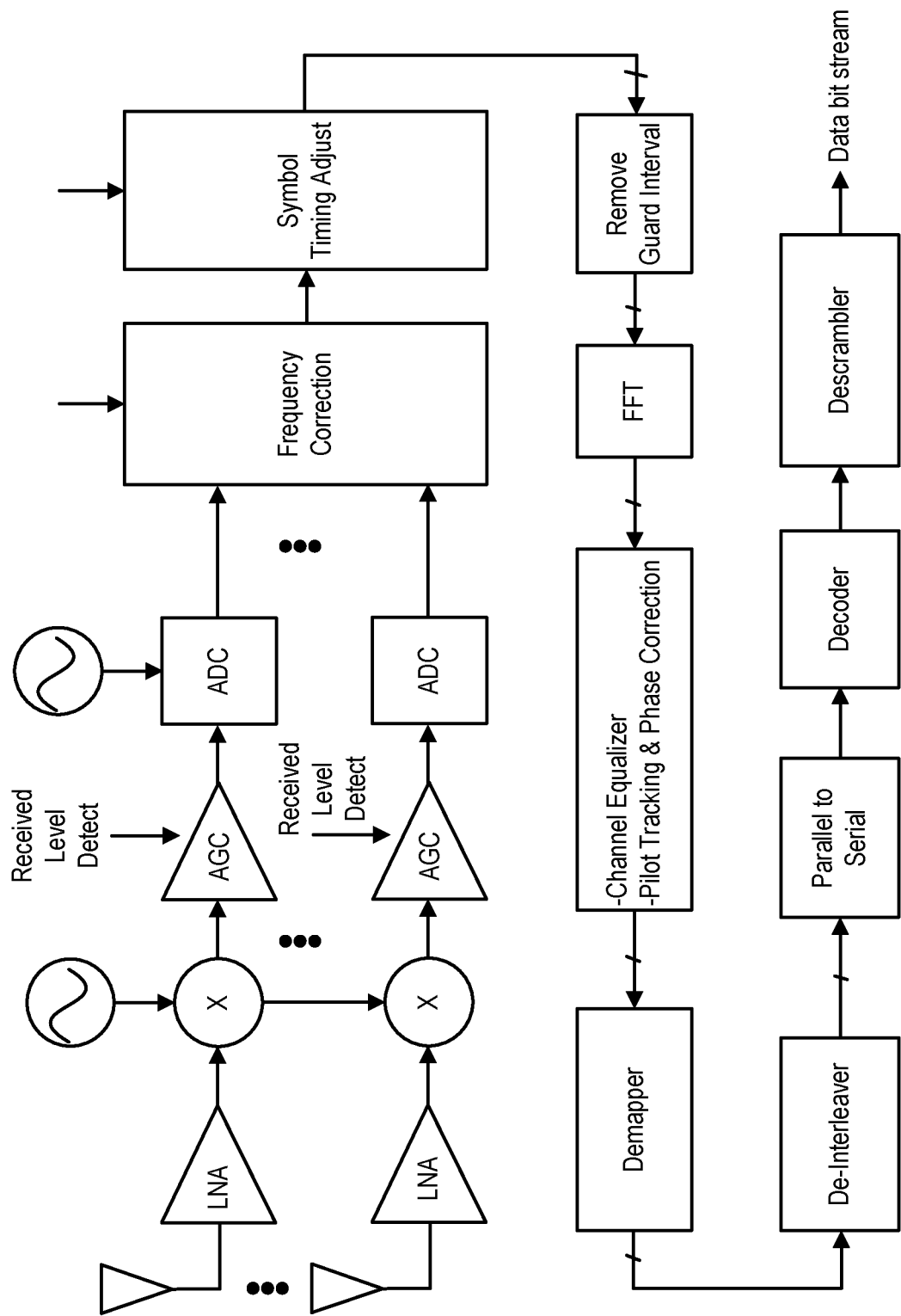
FIG. 17 depicts an example of an IEEE 802.11n/ac receiver bock diagram.

FIG. 17 depicts an example of an IEEE 802.11n/ac receiver bock diagram. Signals are received at two or more antennas, each is amplified by an LNA, each is down converted, AGC applied, and each is separately digitized. The digitized signals are frequency corrected, symbol timing is adjusted, the guard interval is removed, an FFT is performed, channel equalization and pilot tracking and phase correction applied. The signal is then demapped, deinterleaved, converted back to a serial digital signal, decoded, and descrambled to produce an output data stream.

FIG. 18 depicts a table with examples of IEEE 802.11n/ac modes and data rates. Listed are parameters for modulation and coding scheme (MCS) indexes 8-23 for 802.11ac systems including 1 stream, 2 streams, 3 streams, and 4 streams. the table includes columns for modulation, code rate R, coded bits per single carrier for each spatial stream (BP-SCS), coded bits per symbol (CBPS), data bits per OFDM symbol (DBPS), and data rate. MCS indexes 0-7 (not shown) are for legacy systems.

FIG. 19 depicts another table with examples of IEEE 802.11n/ac modes and data rates. Listed are parameters for modulation and coding scheme (MCS) indexes 16-31 for 802.11ac systems including 3 streams and 4 streams.

Figure 20:
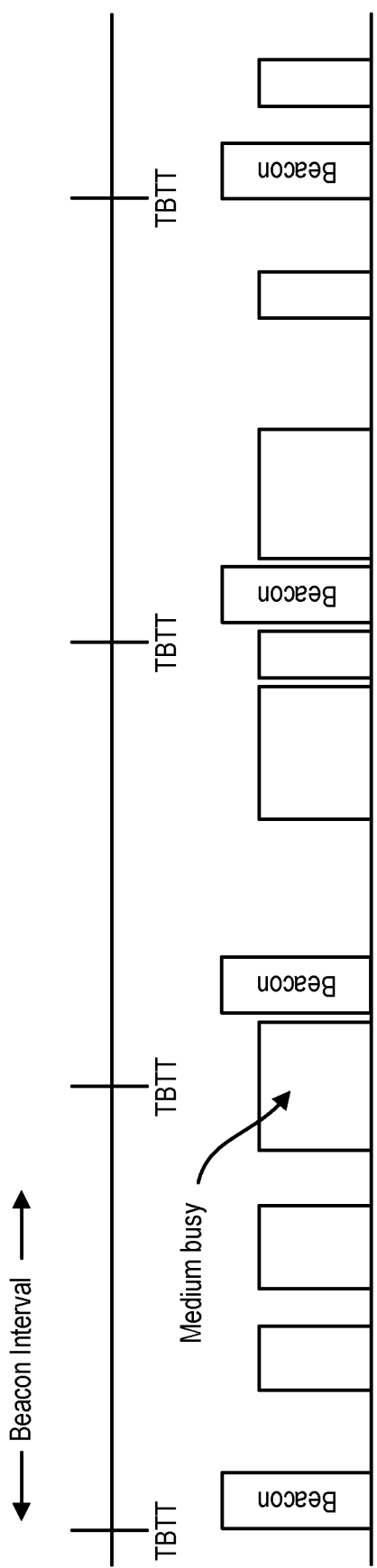
FIG. 20 depicts a timing diagram including a beacon.

FIG. 20 depicts a timing diagram including a beacon. The diagram includes a target beacon transmission time. When the medium is not busy, the beacon transmits at the target beacon transmission times. When the medium is busy, the beacon may be delayed until the medium is free again. The beacons contain MAC level timing information, for example, a SYNC message such as the sync message used in the DOCSIS cable modem protocol.

Figure 21:
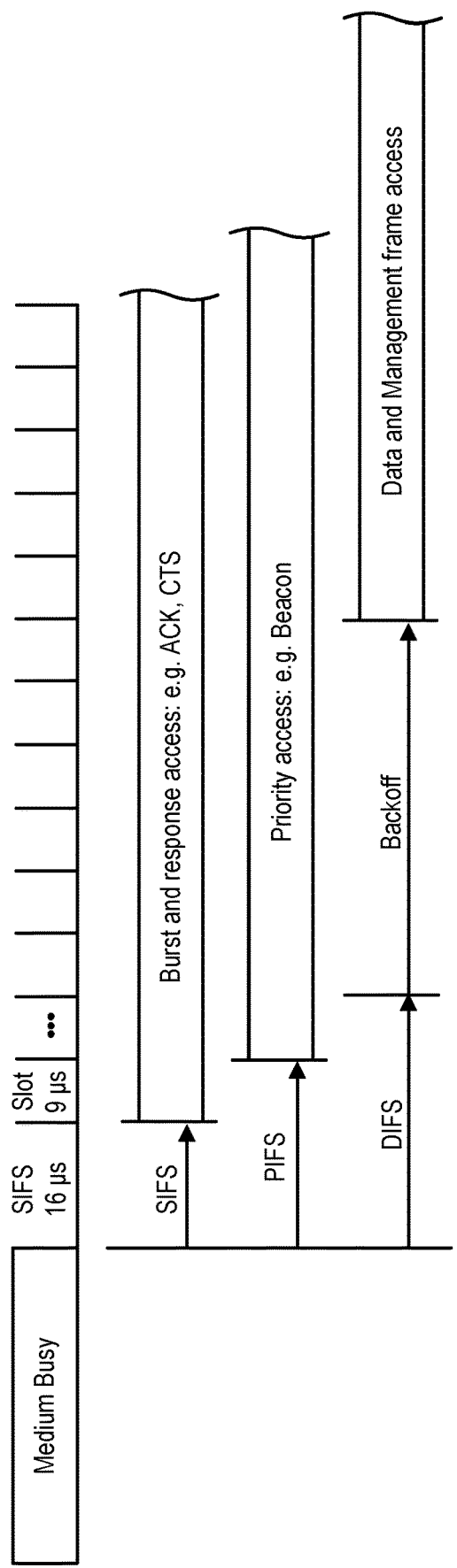
FIG. 21 depicts traffic scheduling in a carrier sense multiple access (CSMA) scheme.

FIG. 21 depicts traffic scheduling in a carrier sense multiple access (CSMA) scheme with collision avoidance (CA). Shown are different time delays for different types of traffic including traffic corresponding to a short interframe space (SIF), PCF (point coordination function) interframe space (PIF), and DCF (distributed coordination function) interframe space (DIF).

Figure 22:
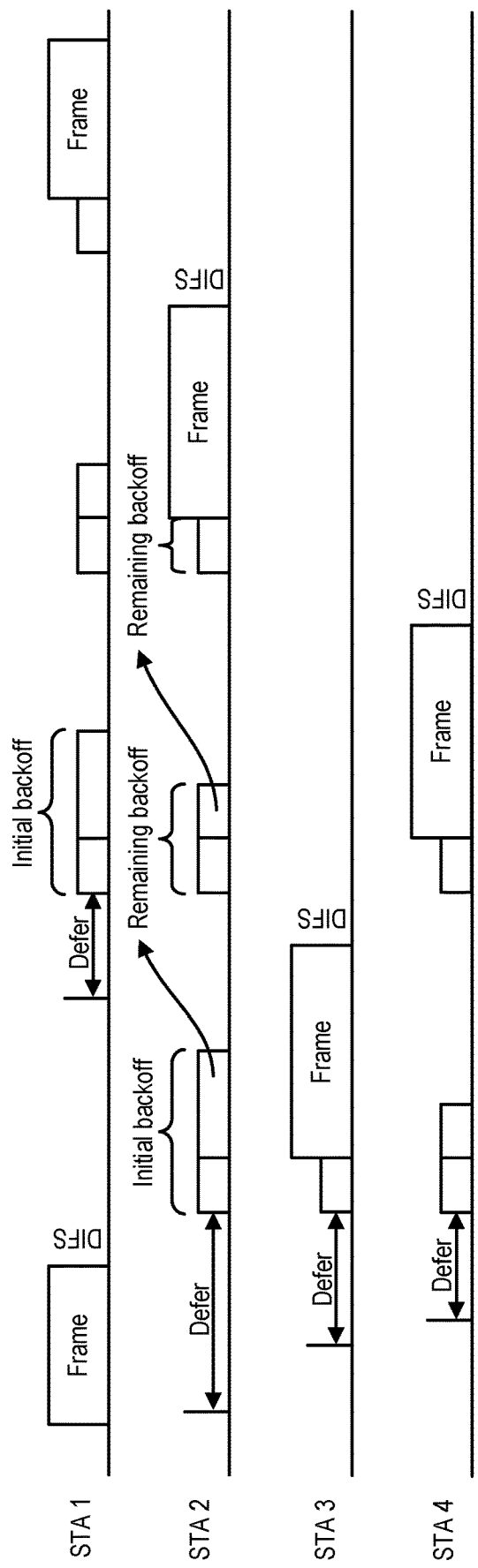
FIG. 22 depicts an example of sharing a medium between four stations.

FIG. 22 depicts an example of sharing a medium among four stations (STA1-STA4). Each station sends a frame of data when the medium is free and defers or backs off when the medium is not free.

Figure 23:
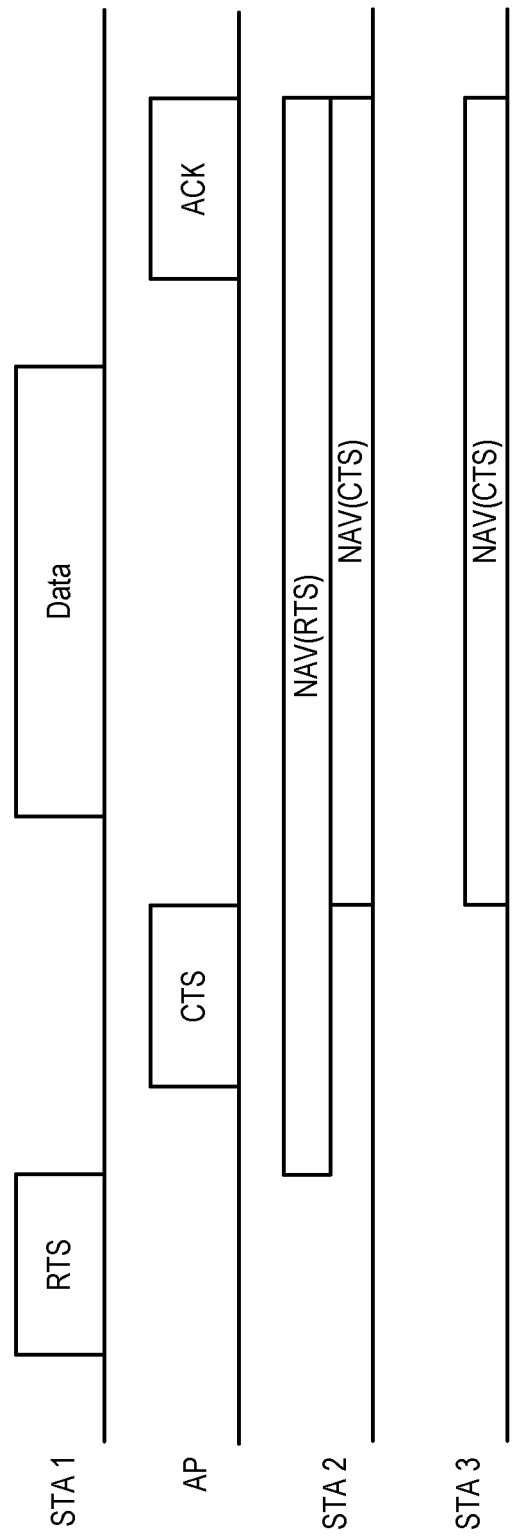
FIG. 23 depicts an example of a network allocation vector (NAV) for collision avoidance.

FIG. 23 depicts an example of a network allocation vector (NAV) for collision avoidance. Shown is an RTS/CTS exchange for hidden node protection.

Figure 24:
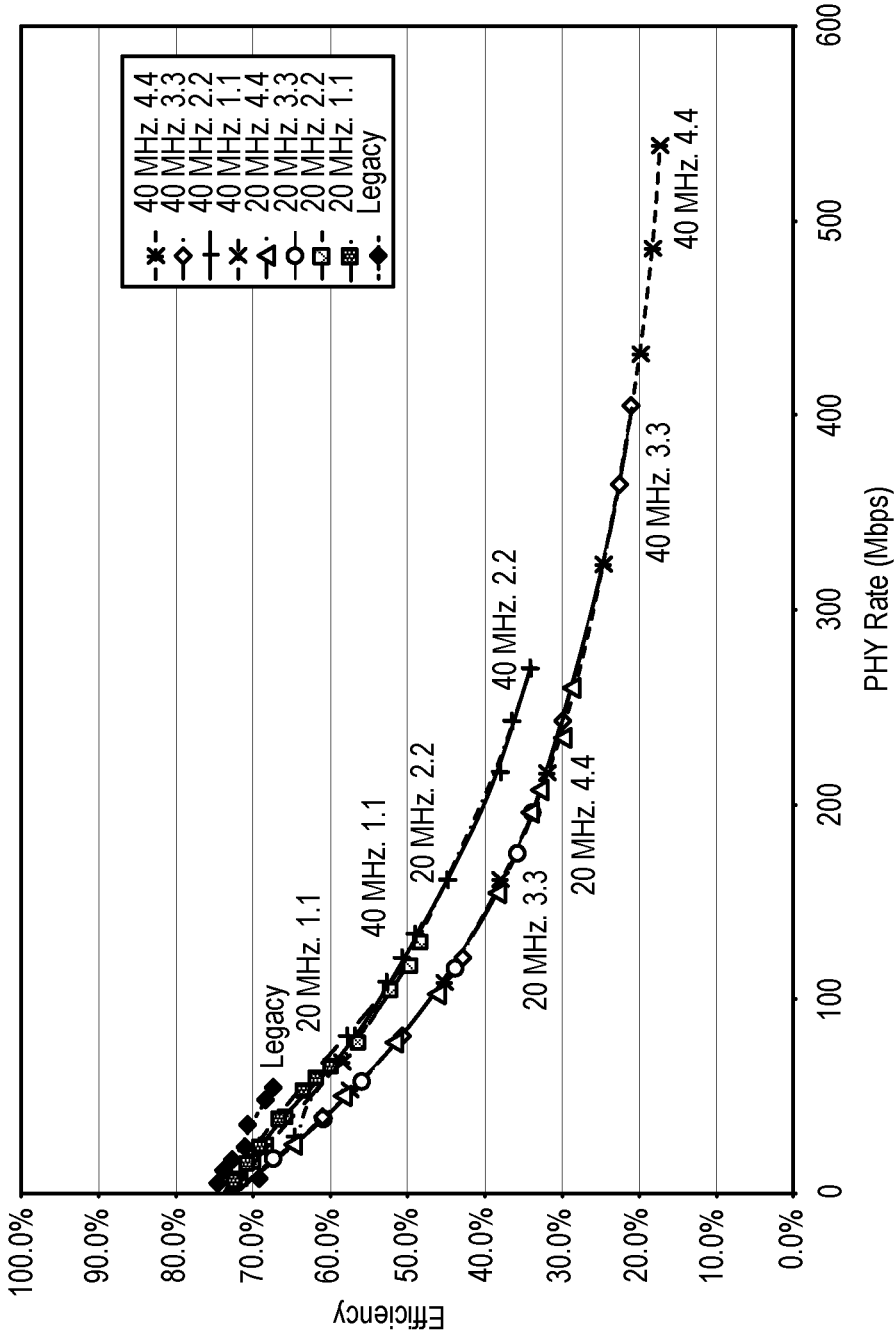
FIG. 24 depicts an example of a plot of media access control (MAC) efficiency vs. physical layer data rate for various bandwidths.

FIG. 24 depicts an example of a plot of medium access control (MAC) efficiency for a traditional MAC vs. physical layer data rate for various bandwidths. Shown is the efficiency for 20 MHz and 40 MHz bandwidths and for a legacy system.

Figure 25:
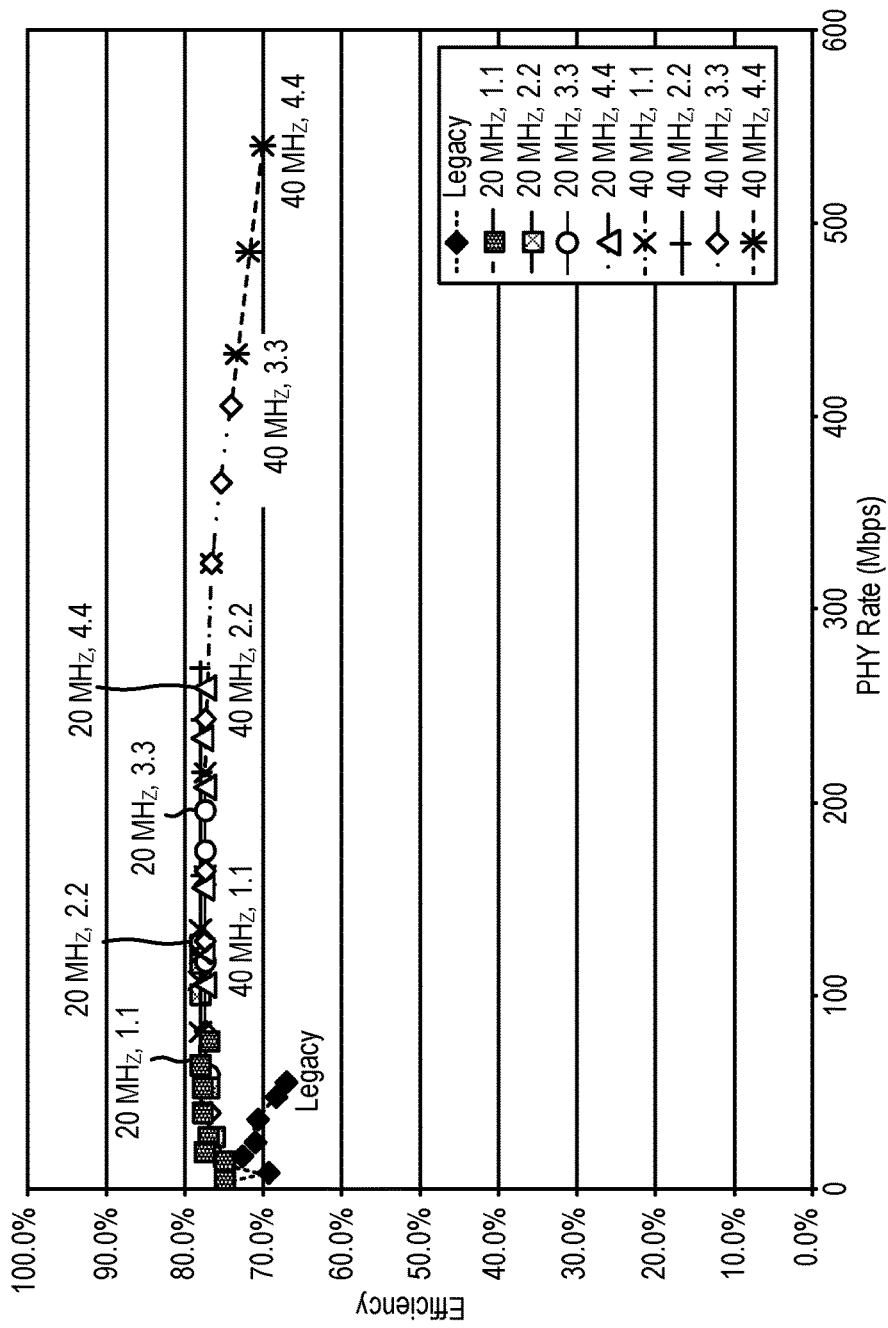
FIG. 25 depicts an example of a plot of IEEE 802.11n media access control (MAC) efficiency vs. physical layer data rate for various bandwidths.

FIG. 25 depicts an example of a plot of IEEE 802.11n medium access control (MAC) efficiency vs. physical layer data rate for various bandwidths. Shown is the efficiency for 20 MHz and 40 MHz bandwidths and for a legacy system.

FIG. 26 depicts a chart showing reasons for MAC efficiency improvement.

FIG. 27 depicts a process 2700, in accordance with some example embodiments. The process 2700 is of digital communication between a first wireless device and a second wireless device, wherein the process 2700 is implemented in the first wireless device. At 2710, the process 2700 includes transmitting, by the first wireless device, data for reception by the second wireless device in accordance with a conventional standard. At 2720, the process 2700 further includes determining, by the first wireless device a capability of the second wireless device, to communicate in accordance with an orthogonal time frequency space (OTFS) modulation scheme. At 2730, the process 2700 includes transmitting, to the second wireless device data in accordance with the OTFS modulation scheme, a preamble and one or more OTFS symbols, wherein one or more bits in the preamble indicate to the second wireless device that the one or more OTFS symbols have been sent in accordance with the OTFS modulation scheme.

In some embodiments, the first wireless device may be an access point and the second wireless device may be a station or the first wireless device may be a station and the second wireless device may be an access point. In some embodiments, the conventional standard may use an orthogonal frequency division multiplexing (OFDM) scheme and/or the conventional standard may be WiFi. In some embodiments, the preamble may be formatted in accordance with IEEE 802.11n and/or a bit value in the preamble not used in IEEE 802.11n may be used to indicate OTFS modulation. The preamble may be formatted in accordance with IEEE 802.11ac and/or a bit value in the preamble not used in IEEE 802.11ac indicates the OTFS modulation scheme. In some embodiments, the first wireless device may operate in accordance with an orthogonal frequency division multiplexing (OFDM) scheme in a conventional standard to communicate with a third wireless device and may operate in accordance with the OTFS modulation scheme to communicate with the second wireless device.

Figure 28:
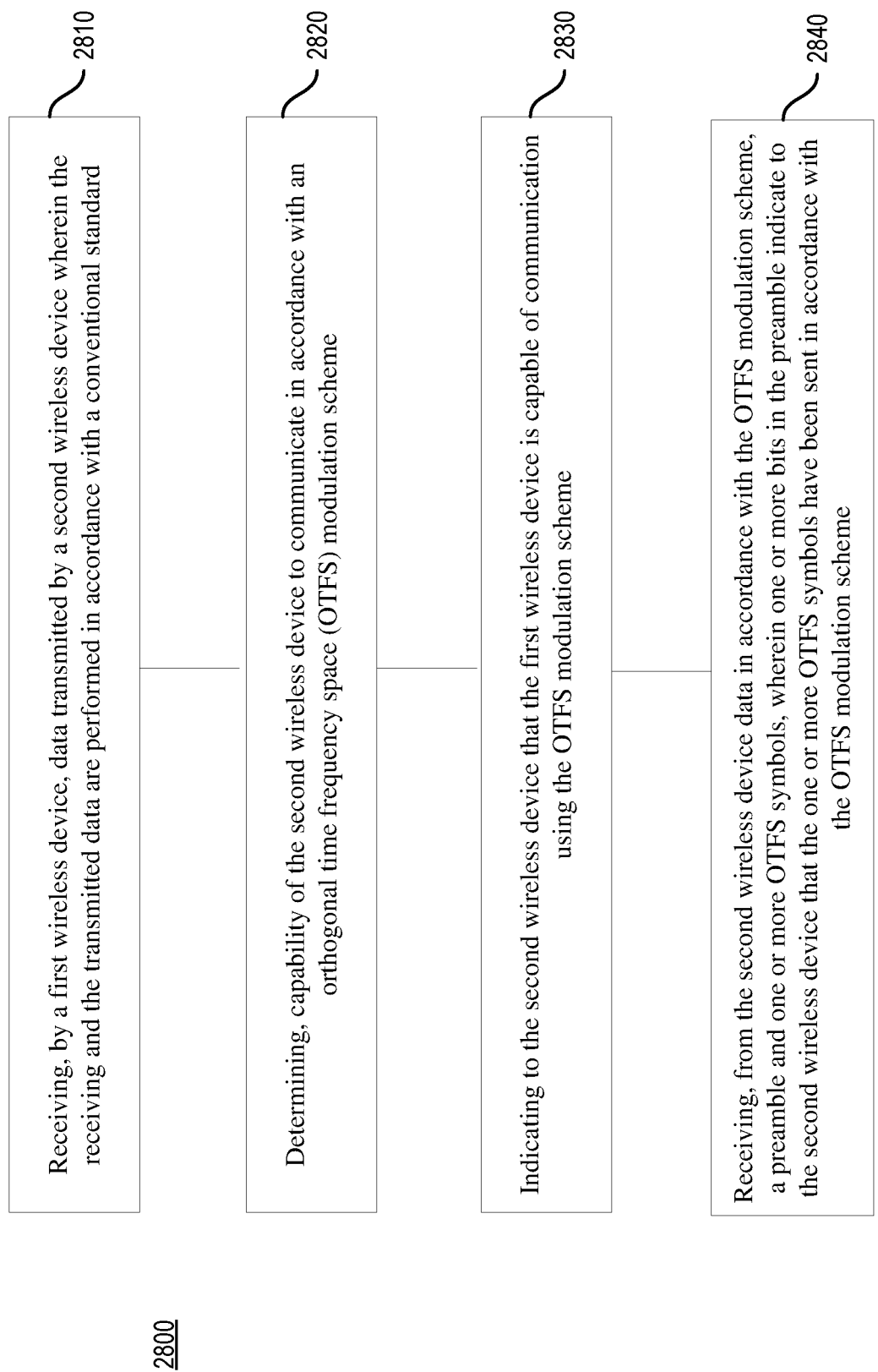
FIG. 28 depicts another process, in accordance with some example embodiments.

FIG. 28 depicts another process 2800, in accordance with some example embodiments. The process 2800 is of digital communication between a first wireless device and a second wireless device implemented at the first wireless device. At 2810, the process 2800 includes receiving, by the first wireless device, data transmitted by the second wireless device wherein the receiving and the transmitted data are performed in accordance with a conventional standard. At 2820, the process 2800 further includes determining, based on a transmission received from the second wireless device using the conventional standard, a capability of the second wireless device to communicate in accordance with an orthogonal time frequency space (OTFS) modulation scheme. At 2830, the process 2800 further includes indicating to the second wireless device that the first wireless device is capable of communication using the OTFS modulation scheme. At 2840, the process 2800 includes receiving, from the second wireless device data in accordance with the OTFS modulation scheme, a preamble and one or more OTFS symbols, wherein one or more bits in the preamble indicate to the second wireless device that the one or more OTFS symbols have been sent in accordance with the OTFS modulation scheme.

In some embodiments of the process 2800, the first wireless device may be an access point and the second wireless device is a station. In some embodiments of the process 2800, the first wireless device may be a station and the second wireless device may be an access point.

The conventional standard may be a WiFi standard and the WiFi standard may use an orthogonal frequency division multiplexing (OFDM) scheme. The preamble may be formatted in accordance with IEEE 802.11n and/or a bit value in the preamble not used in IEEE 802.11n may be used to indicate OTFS modulation. The preamble may be formatted in accordance with IEEE 802.11ac, and/or a bit value in the preamble not used in IEEE 802.11ac may be used to indicate OTFS modulation.

In some embodiments, a method of digital communication between a first wireless device and a second wireless device, the method implemented at the first wireless device may include the following: (a) receiving, by the first wireless device, data including a preamble transmitted by the second wireless device, wherein the preamble is formatted in accordance with a conventional standard, (b) determining, from a predetermined bit sequence in the legacy preamble, to receive payload data according to an orthogonal time frequency space (OTFS) modulation scheme, and (c) receiving and processing payload data in accordance with the OTFS modulation scheme. Different possible embodiments of this method may be as discussed with respect to processes 2700 and 2800.

In some embodiments, a method of digital communication includes establishing, by a first wireless device, a WiFi wireless local area network (WLAN), providing wireless connectivity to a second wireless device in the WiFi WLAN using a legacy conventional standard, and providing, wireless connectivity to a third wireless device in the WLAN using an orthogonal time frequency space (OTFS) modulation protocol, wherein the connectivity to the third wireless device and the second wireless device coexist, and wherein the first wireless device is dual mode by providing the legacy conventional standard and the OTFS modulation protocol. Various embodiments of this method and techniques for using preamble bit values for the indication of the format of message are described with respect to processes 2700 and 2800.

In some embodiments, a method of digital communication includes transmitting a signal for operating a wireless local area network (WLAN), wherein the signal transmission indicates the WLAN operates using an orthogonal time frequency space (OTFS) protocol, receiving a request from a wireless device using the OTFS protocol, and establishing the WLAN with the wireless device.

With respect to the various methods and processes 2700 and 2800, the OTFS protocol may use a modulation scheme as described herein. Furthermore, the receiving operations may include receiving signals and successfully extracting information bits that are encoded or modulated in the signals.

In some embodiments, the process 2700 or 2800 and other methods described herein may be implemented by an apparatus including a memory and a processor, wherein the memory stores instructions which, when executed by the processor, may cause the processor to implement one or more of the features noted above.

In some embodiments, the above-disclosed methods and processes may be embodied in the form of computer-executable program code and stored on a computer-readable medium (CRM). The CRM may be, for example, an optical disk, a magnetic storage device, or one or more memories that can be read from. The program code may include processor-executable instructions that are designed to perform specific steps of the methods and processes.

It will be appreciated that the present document provides several techniques for co-operation and co-existence of conventional wireless networking protocols along with OTFS modulation scheme. It will further be appreciated that receiver and transmitter implementations that re-use some of the functional blocks are also disclosed.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of digital communication between a first wireless device and a second wireless device, the method implemented at the first wireless device, comprising:
   transmitting, by the first wireless device, data for reception by the second wireless device in accordance with a conventional standard;
   determining, by the first wireless device, a capability of the second wireless device to communicate in accordance with an orthogonal time frequency space (OTFS) modulation scheme; and
   transmitting, to the second wireless device data in accordance with the OTFS modulation scheme, a preamble and one or more OTFS symbols, wherein one or more bits in the preamble indicate to the second wireless device that the one or more OTFS symbols have been sent in accordance with the OTFS modulation scheme, wherein the preamble is formatted in accordance with IEEE 802.11n, and wherein a bit value in the preamble that is not used in IEEE 802.11n indicates the OTFS modulation scheme.

2. A method of digital communication between a first wireless device and a second wireless device, the method implemented at the first wireless device, comprising:
   transmitting, by the first wireless device, data for reception by the second wireless device in accordance with a conventional standard;
   determining, by the first wireless device, a capability of the second wireless device to communicate in accordance with an orthogonal time frequency space (OTFS) modulation scheme; and
   transmitting, to the second wireless device data in accordance with the OTFS modulation scheme, a preamble and one or more OTFS symbols, wherein one or more bits in the preamble indicate to the second wireless device that the one or more OTFS symbols have been sent in accordance with the OTFS modulation scheme, wherein the preamble is formatted in accordance with IEEE 802.11ac, and wherein a bit value in the preamble that is not used in IEEE 802.11ac indicates the OTFS modulation scheme.

3. A method of digital communication between a first wireless device and a second wireless device, the method implemented at the first wireless device, comprising:
   receiving, by the first wireless device, data transmitted by the second wireless device wherein the receiving and the transmitted data are performed in accordance with a conventional standard;
   determining, based on a transmission received from the second wireless device using the conventional standard, a capability of the second wireless device to communicate in accordance with an orthogonal time frequency space (OTFS) modulation scheme;
   indicating to the second wireless device that the first wireless device is capable of communication using the OTFS modulation scheme; and
   receiving, from the second wireless device data in accordance with the OTFS modulation scheme, a preamble and one or more OTFS symbols, wherein one or more bits in the preamble indicate to the second wireless device that the one or more OTFS symbols have been sent in accordance with the OTFS modulation scheme.

4. The method of claim 3, wherein the first wireless device is a station and the second wireless device is an access point.

5. The method of claim 3, wherein the conventional standard uses an orthogonal frequency division multiplexing (OFDM) scheme.

6. The method of claim 3, wherein the preamble is formatted in accordance with IEEE 802.11n, and wherein a bit value in the preamble that is not used in IEEE 802.11n indicates the OTFS modulation scheme.

7. The method of claim 3, wherein the preamble is formatted in accordance with IEEE 802.11ac, and wherein a bit value in the preamble that is not used in IEEE 802.11ac indicates the OTFS modulation scheme.

8. A first wireless communication device comprising a processor, wherein the processor is configured to:
   transmit, by the first wireless device, data for reception by a second wireless device in accordance with a conventional standard;
   determine, by the first wireless device a capability of the second wireless device, to communicate in accordance with an orthogonal time frequency space (OTFS) modulation scheme; and
   transmit, to the second wireless device data in accordance with the OTFS modulation scheme, a preamble and one or more OTFS symbols, wherein one or more bits in the preamble indicate to the second wireless device that the one or more OTFS symbols have been sent in accordance with the OTFS modulation scheme,
   wherein the preamble is formatted in accordance with IEEE 802.11n or IEEE 802.11ac, and wherein a bit value in the preamble that is not used in IEEE 802.11n or IEEE 802.11ac, respectively, indicates the OTFS modulation scheme.

9. The device of claim 8, wherein the first wireless device is an access point and the second wireless device is a station.

10. The device of claim 8, wherein the conventional standard uses an orthogonal frequency division multiplexing (OFDM) scheme.

11. The device of claim 8, wherein the first wireless device operates in accordance with an orthogonal frequency division multiplexing (OFDM) scheme in the conventional standard to communicate with a third wireless device and operates in accordance with the OTFS modulation scheme to communicate with the second wireless device.

* * * * *